United States Patent
Krishnan et al.

(10) Patent No.: US 11,573,838 B2
(45) Date of Patent: Feb. 7, 2023

(54) METHODS AND APPARATUS TO IMPROVE WORKLOAD DOMAIN MANAGEMENT IN VIRTUALIZED SERVER SYSTEMS USING A FREE POOL OF VIRTUALIZED SERVERS

(71) Applicant: VMware, Inc., Palo Alto, CA (US)

(72) Inventors: Santhana Krishnan, Cupertino, CA (US); Thayumanavan Sridhar, Sunnyvale, CA (US); Chitrank Seshadri, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 302 days.

(21) Appl. No.: 16/047,868

(22) Filed: Jul. 27, 2018

(65) Prior Publication Data
US 2019/0324808 A1 Oct. 24, 2019

Related U.S. Application Data

(60) Provisional application No. 62/660,742, filed on Apr. 20, 2018.

(51) Int. Cl.
*G06F 9/50* (2006.01)
*G06F 9/48* (2006.01)
(Continued)

(52) U.S. Cl.
CPC .............. *G06F 9/5077* (2013.01); *G06F 8/65* (2013.01); *G06F 9/45558* (2013.01); *G06F 9/4856* (2013.01); *G06F 9/505* (2013.01); *G06F 9/5022* (2013.01); *G06F 2009/4557* (2013.01); *G06F 2009/45562* (2013.01); *G06F 2009/45583* (2013.01); *G06F 2209/501* (2013.01); *G06F 2209/503* (2013.01); *G06F 2209/5011* (2013.01); *G06F 2209/5022* (2013.01)

(58) Field of Classification Search
None
See application file for complete search history.

(56) References Cited

U.S. PATENT DOCUMENTS

| 2011/0191477 | A1 | 8/2011 | Zhang et al. | |
| 2015/0106520 | A1* | 4/2015 | Breitgand | H04L 43/16 709/226 |

(Continued)

OTHER PUBLICATIONS

United States Patent and Trademark Office, "Non-Final Office Action", issued in connection with U.S. Appl. No. 16/047,869, dated Mar. 4, 2020, (12 pages).

*Primary Examiner* — Wynuel S Aquino
(74) *Attorney, Agent, or Firm* — Hanley, Flight & Zimmerman, LLC

(57) ABSTRACT

Methods, apparatus, systems, and articles of manufacture are disclosed to improve workload domain management of virtualized server systems. An example apparatus includes a resource pool handler to generate a pool of virtualized servers including a first virtualized server based on a policy, ones of the virtualized servers to be allocated to a workload domain to execute an application, a resource status analyzer to determine a health status associated with the workload domain and determine whether the health status satisfies a threshold based on the policy, and a resource allocator to allocate the first virtualized server to the workload domain to execute the application when the health status is determined to satisfy the threshold.

30 Claims, 11 Drawing Sheets

(51) Int. Cl.
*G06F 9/455* (2018.01)
*G06F 8/65* (2018.01)

(56) References Cited

U.S. PATENT DOCUMENTS

| | | | |
|---|---|---|---|
| 2016/0277304 A1* | 9/2016 | Challa | G06F 9/5077 |
| 2016/0371127 A1* | 12/2016 | Antony | G06F 9/505 |
| 2017/0097845 A1* | 4/2017 | Kouznetsov | G06F 9/45558 |
| 2017/0286148 A1* | 10/2017 | Zou | G06F 9/45558 |
| 2018/0267833 A1* | 9/2018 | Chen | G06F 9/45558 |
| 2018/0276021 A1* | 9/2018 | Ueda | G06F 9/45558 |
| 2018/0341507 A1* | 11/2018 | Inbaraj | G06F 9/452 |
| 2019/0235922 A1* | 8/2019 | Iovanna | H04L 67/1004 |
| 2019/0266534 A1* | 8/2019 | Kessaci | G06F 9/45558 |
| 2019/0324820 A1 | 10/2019 | Krishnan et al. | |

* cited by examiner

METHODS AND APPARATUS TO IMPROVE WORKLOAD DOMAIN MANAGEMENT IN VIRTUALIZED SERVER SYSTEMS USING A FREE POOL OF VIRTUALIZED SERVERS

RELATED APPLICATION

This patent arises from an application claiming the benefit of U.S. Provisional Patent Application Ser. No. 62/660,742, which was filed on Apr. 20, 2018. U.S. Provisional Patent Application Ser. No. 62/660,742 is hereby incorporated herein by reference in its entirety. Priority to U.S. Provisional Patent Application Ser. No. 62/660,742 is hereby claimed.

FIELD OF THE DISCLOSURE

This disclosure relates generally to cloud computing and, more particularly, to methods and apparatus to improve workload domain management in virtualized server systems using a free pool of virtualized servers.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
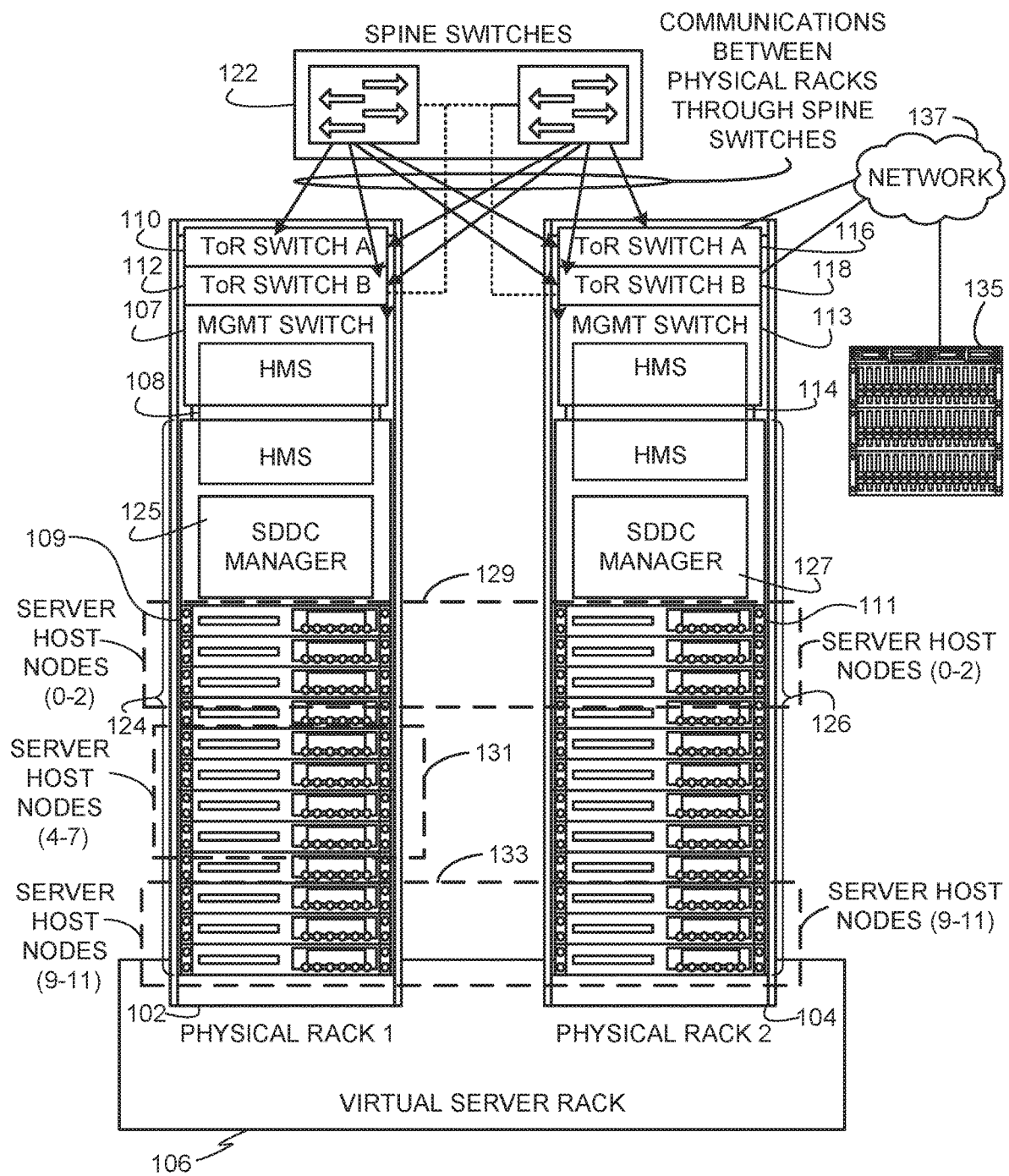
FIG. 1 illustrates example physical racks in an example virtual server rack deployment.

Cloud computing is based on the deployment of many physical resources across a network, virtualizing the physical resources into virtual resources, and provisioning the virtual resources in software defined data centers (SDDCs) for use across cloud computing services and applications. Examples disclosed herein can be used to manage network resources in SDDCs to improve performance and efficiencies of network communications between different virtual and/or physical resources of the SDDCs.

Examples disclosed herein can be used in connection with different types of SDDCs. In some examples, techniques disclosed herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples disclosed herein can be used with one or more different types of virtualization environments. Three example types of virtualization environments are: full virtualization, paravirtualization, and operating system (OS)

virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a containerization. Thus, a process executes within a container that isolates the process from other processes executing on the host OS. In this manner, OS virtualization can be used to provide isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

Examples disclosed herein can be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

A drawback of some virtual server rack systems is that different hardware components located therein can be procured from different equipment vendors, and each equipment vendor can have its own independent OS (OS) installed on its hardware. For example, physical hardware resources include white label equipment such as white label servers, white label network switches, white label external storage arrays, and white label disaggregated rack architecture systems (e.g., Intel's Rack Scale Architecture (RSA), etc.). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding.

In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration can require additional network bandwidth, which may not be released until the reconfiguration is complete.

Examples disclosed herein provide HCI-based SDDCs with system-level governing features that can actively monitor and manage different hardware and software components of a virtual server rack system even when such different hardware and software components execute different OSs. As described in connection with FIG. 2, major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

When starting up a cloud computing environment or adding resources to an already established cloud computing environment, data center operators struggle to offer cost-effective services while making resources of the infrastructure (e.g., storage hardware, computing hardware, and networking hardware) work together to achieve simplified installation/operation and optimize the resources for improved performance. Prior techniques for establishing and maintaining data centers to provide cloud computing services often require customers to understand details and configurations of hardware resources to establish workload domains in which to execute customer services. As used herein, the term "workload domain" refers to virtual hardware policies or subsets of virtual resources of a VM mapped to physical hardware resources to execute a user application.

In examples disclosed herein, workload domains are mapped to a management domain deployment (e.g., a cluster of hosts managed by a vSphere management product developed and provided by VMware, Inc.) in a single rack deployment in a manner that is relatively easier to understand and operate by users (e.g., clients, customers, etc.) than prior techniques. In this manner, as additional racks are added to a system, cross-rack clusters become an option. This enables creating more complex configurations for workload domains as there are more options for deployment as well as additional management domain capabilities that can be leveraged. Examples disclosed herein facilitate making workload domain configuration and management easier than prior techniques.

A management domain is a group of physical machines and VMs that host core cloud infrastructure components necessary for managing a SDDC in a cloud computing environment that supports customer services. Cloud computing allows ubiquitous, convenient, on-demand network access to a shared pool of configurable computing resources (e.g., a pool of hardware resources, etc.). A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, machine learning, capacity, availability, and performance requirements for establishing workload domains in server rack deployments without requiring the users to have in-depth knowledge of server rack hardware and/or configurations.

As used herein, availability refers to the percentage of continuous operation that can be expected for a requested duration of operation of a workload domain. The level of availability can be increased or decreased based on amounts of redundancy of components (e.g., switches, hosts, VMs, containers, etc.). As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and power capabilities of a workload domain. As used herein, capacity refers to the aggregate number of resources (e.g., aggregate storage, aggregate CPU, aggregate respective hardware accelerators (e.g., field programmable gate arrays (FPGAs), graphic processing units (GPUs)), etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options). In some examples, resources are computing devices with set amounts of storage, memory, CPUs, etc. In some examples, resources are individual devices (e.g., hard drives, processors, memory chips, etc.).

Examples disclosed herein improve workload domain management in virtualized server systems by dynamically adjusting resources associated with a workload domain. In some disclosed examples, the SDDC manager populates and manages a free pool of resources such as virtualized servers based on requirements, end user specifications, etc. For example, the SDDC manager may compose a server including computing resources, networking resources, storage resources, etc., to the free pool.

In some disclosed examples, the SDDC manager can allocate the server in the free pool to an existing workload domain in response to comparing a health status associated with the existing workload domain to a health status threshold. For example, the health status may correspond to a quantification of the availability, the capacity, the performance, the security, etc., associated with the workload domain. For example, a health status threshold may correspond to a requirement, a specification, etc., specified by a rule defined by a policy regarding a function or operation of a workload domain. For example, the SDDC manager may compare a health status of a server of a workload domain to a health status threshold to determine whether the server of the workload domain is complying with one or more policy rules specified by the policy. The example SDDC manager can allocate one or more servers in the free pool to the workload domain until the health statuses comply with and/or otherwise satisfy the policy rules.

In some disclosed examples, the SDDC manager manages the free pool by composing or decomposing servers included in the free pool. For example, the SDDC manager can decompose a server that has not been used for a specified period of time. In other examples, the SDDC manager can compose a server when a quantity of servers in the free pool is not greater than a minimum server quantity threshold. In some disclosed examples, the SDDC manager manages the free pool by adjusting a configuration of a server in the free pool. For example, the SDDC manager may determine configuration parameters of a server based on a policy. The SDDC manager may compare a configuration parameter of a server in the free pool to a configuration parameter defined by the policy. The SDDC manager may determine to add or remove resources from a server in the free pool when the configuration parameter of the server does not satisfy the configuration parameter associated with the policy. For example, a configuration parameter of 5 TB of storage may not satisfy a policy configuration parameter associated with 10 TB of storage based on the configuration parameter of 5 TB being less than the policy configuration parameter of 10 TB. In other examples, a configuration parameter associated with a hardware firmware version of 2.0 may satisfy a policy configuration parameter associated with a hardware firmware version of 1.8 based on the configuration parameter being greater than the policy configuration parameter.

In some disclosed examples, the SDDC manager updates a workload domain by exchanging resources between the workload domain and the free pool. For example, the SDDC manager can allocate a first server from the free pool to the workload domain and move a workload on a second server of the workload domain to the first server. In response to at least the allocation, the example SDDC manager can release the second server to the free pool and decompose the second server after the release. In some disclosed examples, the SDDC manager aggregates workload domains on existing servers to optimize available resources. For example, the SDDC manager can move one or more workloads from a first server of a workload domain to a second server of the workload domain. When all workloads have been moved from the first server, the SDDC manager can allocate the first server to the free pool and decompose the first server to shrink and/or otherwise reduce the workload domain to improve utilization of resources allocated to the workload domain.

In some disclosed examples, the SDDC manager updates the workload domain by performing a firmware update (e.g., an embedded software update) on one or more servers included in the workload domain. For example, the SDDC manager can compose a server with upgraded firmware (e.g., an upgraded server) and add the upgraded server to the free pool. The example SDDC manager can allocate the upgraded server to a workload domain where the SDDC manager can move a workload from a server without the upgraded firmware (e.g., a non-upgraded server) to the upgraded server. The example SDDC manager can process the non-upgraded server by deallocating the non-upgraded server from the workload domain to the free pool and determine whether to upgrade and/or decompose the non-upgraded server.

FIG. 1 illustrates example physical racks 102, 104 in an example deployment of a virtual server rack 106. The virtual server rack 106 of the illustrated example enables abstracting hardware resources (e.g., physical hardware resources 124, 126, etc.). In some examples, the virtual server rack 106 includes a set of physical units (e.g., one or more racks, etc.) with each unit including hardware such as server nodes (e.g., compute+storage+network links, etc.), network switches, and, optionally, separate storage units. From a user perspective, the example virtual server rack 106 is an aggregated pool of logic resources exposed as one or more VMWARE ESXI™ clusters along with a logical storage pool and network connectivity. As used herein, the term "cluster" refers to a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR switch A 110, an example ToR switch B 112, an example management switch 107, and an example server host node(0) 109. In the illustrated example, the management switch 107 and the server host node(0) 109 run a hardware management system (HMS) 108 for the first physical rack 102. The second physical rack 104 of the illustrated example is also provided with an example ToR switch A 116, an example ToR switch B 118, an example management switch 113, and an example server host node (0) 111. In the illustrated example, the management switch 113 and the server host node (0) 111 run an HMS 114 for the second physical rack 104.

In the illustrated example, the HMS 108, 114 connects to server management ports of the server host node(0) 109, 111 (e.g., using a baseboard management controller (BMC), etc.), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In some examples, the spine switches 122 can be powered on or off via the SDDC manager 125, 127 and/or the HMS 108, 114 based on a type of network fabric being used. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private IP management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management.

In the illustrated example, the ToR switches 110, 112, 116, 118 connect to server NIC ports (e.g., using 10 Gbps links, etc.) of server hosts in the physical racks 102, 104 for downlink communications and to the spine switch(es) 122 (e.g., using 40 Gbps links, etc.) for uplink communications. In the illustrated example, the management switch 107, 113 is also connected to the ToR switches 110, 112, 116, 118 (e.g., using a 10 Gbps link, etc.) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126, etc.) of the physical rack 102, 104. In the illustrated example, the IB connection interfaces to physical hardware resources 124, 126 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical hardware resources 124, 126 and to keep server objects and switch objects up to date. Example IB operations performed by the HMS 108, 114 include controlling power state, accessing temperature sensors, controlling Basic Input/Output System (BIOS) inventory of hardware (e.g., CPUs, memory, disks, etc.), event monitoring, and logging events.

The HMSs 108, 114 of the corresponding physical racks 102, 104 interface with software-defined data center (SDDC) managers 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the SDDC manager 125 of the first physical rack 102 runs on a cluster of three server host nodes of the first physical rack 102, one of which is the server host node(0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the SDDC manager 127 of the second physical rack 104 runs on a cluster of three server host nodes of the second physical rack 104, one of which is the server host node(0) 111.

In the illustrated example, the SDDC managers 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The SDDC manager 125 of the first physical rack 102 runs on a cluster of three server host nodes of the first physical rack 102 using a high availability (HA) mode configuration. In addition, the SDDC manager 127 of the second physical rack 104 runs on a cluster of three server host nodes of the second physical rack 104 using the HA mode configuration. Using the HA mode in this manner, enables fault tolerant operation of the SDDC manager 125, 127 in the event that one of the three server host nodes in the cluster for the SDDC manager 125, 127 fails. Upon failure of a server host node executing the SDDC manager 125, 127, the SDDC manager 125, 127 can be restarted to execute on another one of the hosts in the cluster. Therefore, the SDDC manager 125, 127 continues to be available even in the event of a failure of one of the server host nodes in the cluster.

In the illustrated example, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.). There is also a configuration buffer as part of the switch object which stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113, etc.) in the physical rack 102, 104. However, any other programming language and any other OS may be used to implement the HMS 108, 114.

In the illustrated example of FIG. 1, the SDDC manager 125, 127 allocates server host nodes(0-2) 109 of the first physical rack 102 and server host nodes(0-2) 111 of the second physical rack 104 to a first workload domain 129. The first workload domain 129 of the illustrated example can execute a computing task specified by a user such as executing an application, processing data, performing a calculation, etc. Further shown in the illustrated example, the SDDC manager 125, 127 allocates the server host nodes(4-7) 109 of the first physical rack 102 to a second workload domain 131. Further shown in the illustrated example, the SDDC manager 125, 127 allocates the server host nodes(9-11) 109 of the first physical rack 102 and the server host nodes(9-11) 111 of the second physical rack 104 to a third workload domain 133. Additionally or alternatively, the example SDDC manager 125, 127 may allocate one or more of the server host nodes(0-11) 109 of the first physical rack to two or more of the workload domains 129, 131, 133.

In the illustrated example of FIG. 1, the SDDC manager 127 of the second physical rack 104 is communicatively coupled to external storage resources 135 via a network 137. Additionally or alternatively, the example SDDC manager 125 of the first physical rack 102 may be communicatively coupled to the external storage resources 135 via the network 137. In the illustrated example of FIG. 1, the external storage resources 135 is a network attached storage (NAS) unit. For example, the external storage resources 135 may include one or more controllers (e.g., specialized servers), one or more interconnect modules, and/or a plurality of storage trays with storage disks. In some examples, the SDDC manager 125, 127 can allocate an external storage resource included in the external storage resources 135 to the first workload domain 129, the second workload domain 131, the third workload domain 133, etc., and/or a combination thereof.

In the illustrated example of FIG. 1, the network 137 is the Internet. However, the example network 137 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 137 enables the SDDC manager 127 of the second physical rack 104 to be in communication with the external storage resources 135. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events. Alternatively, the phrase "in communication," including variances therefore, may encompass direct physical communication and/or constant communication.

Figure 2:
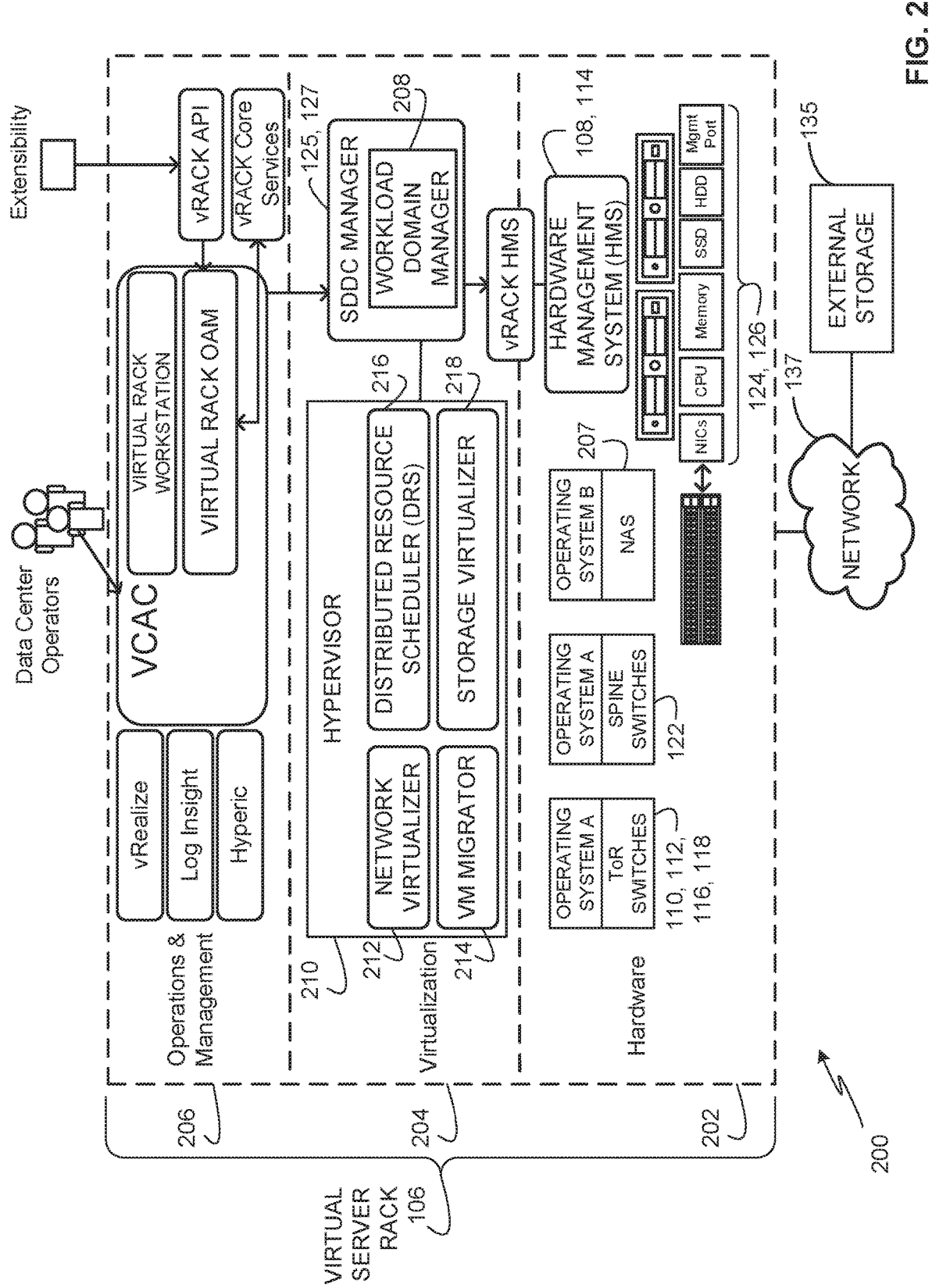
FIG. 2 illustrates an example architecture to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes a hardware layer 202, a virtualization layer 204, and an operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126, virtualizes the physical hardware resources 124, 126 into virtual resources, provisions virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 207. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers, etc.) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host nodes(0) 109, 111 and the ToR switches 110, 112, 116, 118. In the illustrated example, one instance of the HMS 108, 114 runs per physical rack 102, 104. For example, the HMS 108, 114 can run on the management switch 107, 113 and the server host node(0) 109, 111 installed in the example physical rack 102 of FIG. 1. In the illustrated example of FIG. 1 both HMSs 108, 114 are provided in corresponding management switches 107, 113 and the corresponding server host nodes(0) 109, 111 as a redundancy feature in which one of the HMSs 108, 114 is a primary HMS, while the other one of the HMSs 108, 114 is a secondary HMS. In this manner, one of the HMSs 108, 114 can take over as a primary HMS in the event of a failure of a management switch 107, 113 and/or a failure of the server host nodes(0) 109, 111 on which the other HMS 108, 114 executes.

In some examples, to help achieve or facilitate seamless failover, two instances of an HMS 108, 114 run in a single physical rack 102, 104. In such examples, the physical rack 102, 104 is provided with two management switches, and each of the two management switches runs a separate instance of the HMS 108, 114. In such examples, the physical rack 102 of FIG. 1 runs two instances of the HMS 108 on two separate physical hardware management switches and two separate server host nodes(0), and the physical rack 104 of FIG. 1 runs two instances of the HMS 114 on two separate physical hardware management switches and two separate server host nodes(0). For example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes(0) in the physical rack 102 (or the two instances of the HMS 114 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 204 of the illustrated example includes the SDDC manager 125, 127. The example SDDC manager 125, 127 communicates with the HMS 108, 114 to manage the physical hardware resources 124, 126. The example SDDC manager 125, 127 creates the example virtual server rack 106 out of underlying physical hardware resources 124, 126 that may span one or more physical racks (or smaller units such as a hyper-appliance or half rack) and handles physical management of those resources. The example SDDC manager 125, 127 uses the virtual server rack 106 as a basis of aggregation to create and provide operational views, handle fault domains, and scale to accommodate workload profiles. The example SDDC manager 125, 127 keeps track of available capacity in the virtual server rack 106, maintains a view of a logical pool of virtual resources throughout the SDDC life-cycle, and translates logical resource provisioning to allocation of physical hardware resources 124, 126.

In the illustrated example of FIG. 2, the SDDC manager 125, 127 includes a workload domain manager 208 to dynamically adjust resources associated with a workload domain. In some examples, the workload domain manager 208 populates a free pool (e.g., the free pool 302 of FIG. 3) of composable hardware or servers to add to a workload domain to improve an operation of the workload domain. For example, the workload domain manager 208 may direct the HMS 108, 114 to compose servers and populate a free pool with the composed servers. In some examples, the workload domain manager 208 populates the free pool based on one or more parameters associated with a workload domain of interest. Example parameters include one or more cost parameters, one or more health statuses, one or more availability parameters, one or more capacity parameters, one or more performance parameters, one or more security parameters, etc. As such, the workload domain manager 208 may obtain information including a cost of composition (e.g., a time duration, a quantity of resources, etc.) to compose one or more servers, a threshold (e.g., a capacity threshold, a utilization threshold, etc.), historical information, characteristics, parameters, etc., associated with one or more of the workload domains 129, 131, 133 of FIG. 1.

In some examples, the workload domain manager 208 allocates a server from the free pool to a workload domain. For example, the workload domain manager 208 may direct the HMS 108, 114 to replace a faulty or non-responsive server in the first workload domain 129 of FIG. 1 with one of the free pool servers. In other examples, the workload domain manager 208 may add one or more servers to the first workload domain 129 when a computing utilization, a storage utilization, etc., satisfies a threshold by exceeding the threshold. For example, the workload domain manager 208 may determine that the first workload domain 129 has a computing utilization of 90% that is greater than a computing utilization threshold of 80%. The workload domain manager 208 may determine to add one or more servers to the first workload domain 129 to reduce the computing utilization from 90% to less than the computing utilization threshold of 80%.

In some examples, the workload domain manager 208 allocates a server from a workload domain to the free pool. For example, the workload domain manager 208 may obtain parameters associated with the first workload domain 129. The workload domain manager 208 may determine that the first workload domain 129 has been overprovisioned with resources based on the parameters. For example, the workload domain manager 208 may determine that workloads being processed by the server host node(2) of the first physical rack 102 and the server host node(2) of the second physical rack 104 can be moved to other server host nodes included in the first workload domain 129. The workload domain manager 208 may determine that the workloads can be moved to reduce a quantity of resources allocated to the first workload domain 129. The workload domain manager 208 may free up the server host node(2) of the physical racks 102, 104 by transferring workloads to one or more of the server host nodes(0-1) of the physical racks 102, 104. The workload domain manager 208 may allocate the server host node(2) of the physical racks 102, 104 to the free pool where the servers associated with the server host node(2) of the physical racks 102, 104 can be disaggregated, allocated to the second workload domain 131 or the third workload domain 133, etc.

In some examples, the workload domain manager 208 manages the free pool. For example, the workload domain manager 208 may direct the HMS 108, 114 to decompose an unused free pool server. In other examples, the workload domain manager 208 may instruct the HMS 108, 114 to compose and add a server to the free pool when a quantity of free pool servers is less than a specified quantity. In some examples, the workload domain manager 208 uses the free pool of resources to perform firmware updates on resources allocated to the workload domains 129, 131, 133 of FIG. 1. For example, the workload domain manager 208 may allocate a free pool server with upgraded firmware to the first workload domain 129, transfer a workload from a non-upgraded server to the upgraded server, and transfer the non-upgraded server to the free pool for processing.

In some examples, the workload domain manager 208 manages the free pool by modifying and/or otherwise adjusting a configuration of servers included in the free pool. For example, the workload domain manager 208 may increase bandwidth capabilities of a server included in the free pool by increasing a network communication speed of one or more NICs associated with the server. In such examples, the workload domain manager 208 can increase the bandwidth capabilities of the server while the server is in the composed state. In other examples, the workload domain manager 208 can add more capacity, new hardware, etc., to the servers included in the free pool. Capacity may refer to storage capacity, processing capacity, or capacity of any other hardware resource. For example, the workload domain manager 208 may add more disk blades to add more storage to existing nodes in the free pool. The workload domain manager 208 may add a shared GPU resource (e.g., a GPU blade), a security resource (e.g., a firewall), etc., and/or a combination thereof to existing nodes in the free pool while the servers are in the composed state.

In the illustrated example of FIG. 2, the SDDC manager 125, 127 interfaces with an example hypervisor 210 of the virtualization layer 204. The example hypervisor 210 is installed and runs on server hosts in the example physical hardware resources 124, 126 to enable the server hosts to be partitioned into multiple logical servers to create VMs. In some examples, the hypervisor 210 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example of FIG. 2, the hypervisor 210 is shown having a number of virtualization components executing thereon including an example network virtualizer 212, an example VM migrator 214, an example distributed resource scheduler (DRS) 216, and an example storage virtualizer 218. In the illustrated example, the SDDC manager 125, 127 communicates with these components to manage and present the logical view of underlying resources such as hosts and clusters. The example SDDC manager 125, 127 also uses the logical view for orchestration and provisioning of workloads.

The example network virtualizer 212 abstracts or virtualizes network resources such as physical hardware switches (e.g., the management switches 107, 113 of FIG. 1, the ToR switches 110, 112, 116, 118, and/or the spine switches 122, etc.) to provide software-based virtual or virtualized networks. The example network virtualizer 212 enables treating physical network resources (e.g., routers, switches, etc.) as a pool of transport capacity. In some examples, the network virtualizer 212 also provides network and security services to VMs with a policy driven approach. The example network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on a server host.

In some examples, the network virtualizer 212 can be implemented using a VMWARE NSX™ network virtualization platform that includes a number of components including a VMWARE NSX™ network virtualization manager. For example, the network virtualizer 212 can include a VMware® NSX Manager™. The NSX Manager can be the centralized network management component of NSX, and is installed as a virtual appliance on any ESX™ host (e.g., the hypervisor 210, etc.) in a vCenter Server environment to provide an aggregated system view for a user. For example, an NSX Manager can map to a single vCenterServer environment and one or more NSX Edge, vShield Endpoint, and NSX Data Security instances. For example, the network virtualizer 212 can generate virtualized network resources such as a logical distributed router (LDR) and/or an edge services gateway (ESG).

The example VM migrator 214 is provided to move or migrate VMs between different hosts without losing state during such migrations. For example, the VM migrator 214 allows moving an entire running VM from one physical server to another with substantially little or no downtime. The migrating VM retains its network identity and connections, which results in a substantially seamless migration process. The example VM migrator 214 enables transferring the VM's active memory and precise execution state over a high-speed network, which allows the VM to switch from running on a source server host to running on a destination server host.

The example DRS 216 is provided to monitor resource utilization across resource pools, to manage resource allocations to different VMs, to deploy additional storage capacity to VM clusters with substantially little or no service disruptions, and to work with the VM migrator 214 to automatically migrate VMs during maintenance with substantially little or no service disruptions.

The example storage virtualizer 218 is software-defined storage for use in connection with virtualized environments. The example storage virtualizer 218 clusters server-attached hard disk drives (HDDs) and solid-state drives (SSDs) to create a shared datastore for use as virtual storage resources in virtual environments. In some examples, the storage virtualizer 218 may be implemented using a VMWARE VIRTUAL SAN™ network data storage virtualization component developed and provided by VMware, Inc.

The virtualization layer 204 of the illustrated example, and its associated components are configured to run VMs. However, in other examples, the virtualization layer 204 may additionally and/or alternatively be configured to run containers. For example, the virtualization layer 204 may be used to deploy a VM as a data computer node with its own guest OS on a host using resources of the host. Additionally and/or alternatively, the virtualization layer 204 may be used to deploy a container as a data computer node that runs on top of a host OS without the need for a hypervisor or separate OS.

In the illustrated example, the OAM layer 206 is an extension of a VMWARE VCLOUD® AUTOMATION CENTER™ (VCAC) that relies on the VCAC functionality and also leverages utilities such as VMWARE VCENTER™ LOG INSIGHT™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMware, Inc. Alternatively, some or all of such components may alternatively be supplied by components with the same and/or similar features developed and/or provided by other virtualization component developers.

Figure 3:
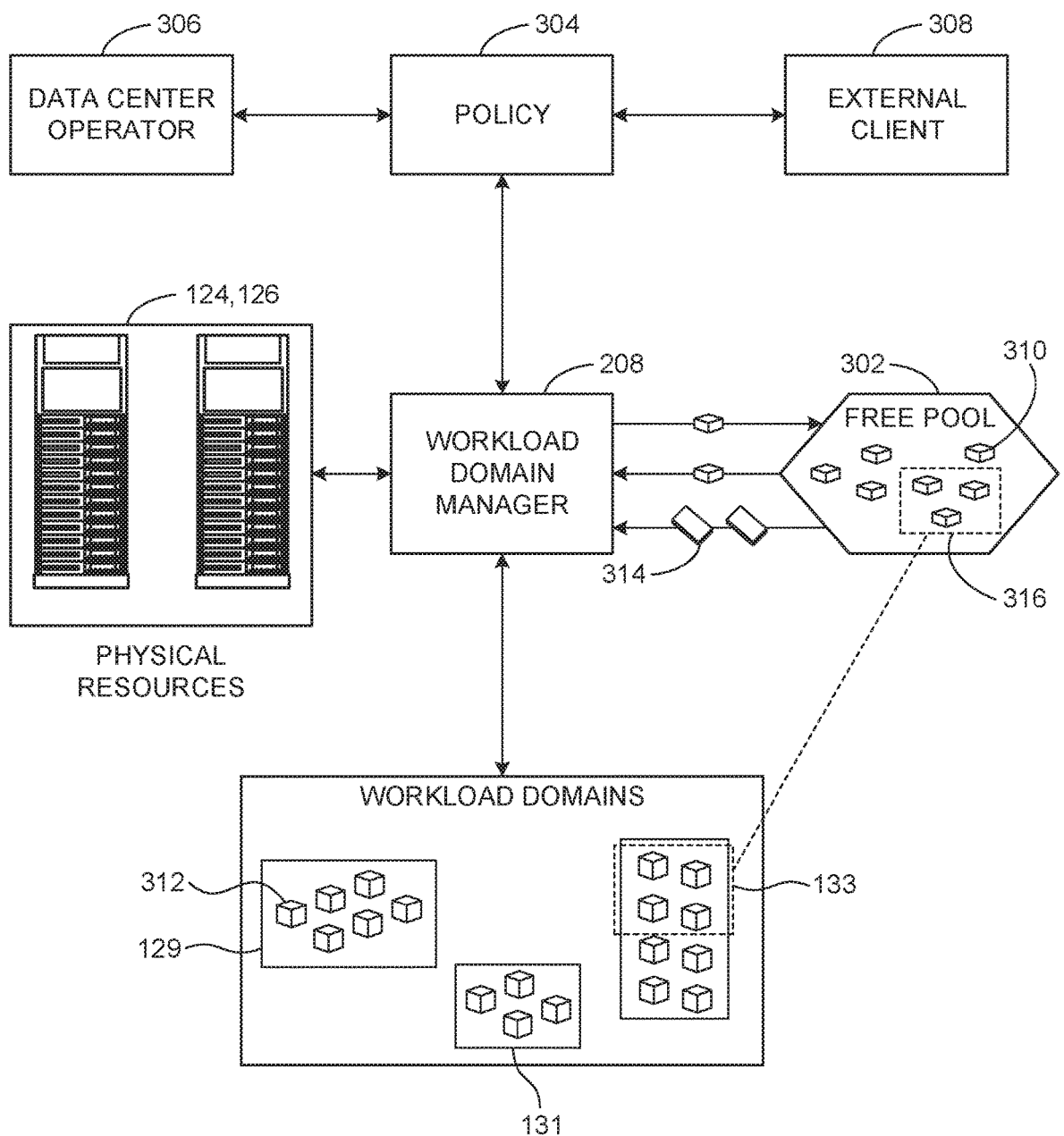
FIG. 3 is an example system to manage workload domains in accordance with examples disclosed herein.

FIG. 3 is a schematic illustration of the example workload domain manager 208 of FIG. 2 managing a free pool 302. In FIG. 3, the example workload domain manager 208 obtains an example policy 304 from an example data center operator 306 and/or an example external client 308. In the illustrated example of FIG. 3, the data center operator 306 is a customer, a user, etc. In FIG. 3, the external client 308 is an external automation client. For example, the external client 308 may be associated with an external server, an external user interface (UI) client, etc.

The example policy 304 of FIG. 3 includes one or more parameters corresponding to composable hardware and/or, more generally, a workload domain using the composable hardware. For example, the policy 304 may include one or more availability requirements, capacity requirements, network requirements, etc., associated with an operation of the workload domains 129, 131, 133 of FIG. 1. In other examples, the policy 304 may include one or more specifications associated with the free pool 302 such as a minimum size of the free pool 302, a maximum size of the free pool 302, a period of time an example free pool server 310 included in the free pool 302 is not in use prior to being removed from the free pool 302, etc. In yet other examples, the policy 304 may include one or more specifications associated with one of the free pool servers 310, one of the workload domain servers 312, etc., such as a firmware version, an operating system type or version, etc., of the servers 310, 312.

In the illustrated example of FIG. 3, the workload domain manager 208 populates the free pool 302 by analyzing parameters associated with the workload domains 129, 131, 133. In some examples, the workload domain manager 208 determines a cost of composition (e.g., a composition time, a quantity of resources, etc.) associated with the workload domains 129, 131, 133. For example, the workload domain manager 208 may determine a quantity of time and/or resources to (1) compose one of the free pool servers 310, (2) add the free pool server 310 to the free pool 302, (3) transfer the free pool server 310 from the free pool 302 to the second workload domain 131, (4) transfer a workload from one of the workload domain servers 312 included in the second workload domain 131 to the free pool server 310, and (5) deallocate the workload domain server 312 from which the workload was transferred to the free pool 302. In such examples, the workload domain manager 208 may determine to perform operations (1)-(5) as described above based on the quantity of time and/or resources being less than a composition time threshold, a resource quantity threshold, etc. For example, the workload domain manager 208 may compose one of the free pool servers 310 based on determining that the composition cost of composing one of the free pool servers 310 is less than the composition time threshold (e.g., a composition time of 5 minutes, 1 hour, 1 day, etc.).

In some examples, the workload domain manager 208 analyzes health information associated with the workload domains 129, 131, 133 including health statuses. In some examples, the workload domain manager 208 obtains the health information from the workload domains 129, 131, 133. In other examples, the workload domain manager 208 obtains the health information from the HMS 108, 114 of FIGS. 1-2. In some examples, the workload domain manager 208 determines one or more health statuses, parameters, etc., based on the health information and evaluates the one or more health statuses, parameters, etc. For example, the workload domain manager 208 may compare a health status of the first workload domain 129 to a health status threshold and determine whether the health status satisfies the health status threshold based on the comparison. For example, a health status satisfying a health status threshold may correspond to a detection of poor performance, overloaded or overutilized hardware resources, etc. In some examples, satisfying the health status threshold corresponds to the health status being greater than the health status threshold. In some examples, satisfying the health status threshold corresponds to the health status being less than the health status threshold.

In some examples, the workload domain manager 208 analyzes information associated with the workload domains 129, 131, 133 that includes historical information, workload domain characteristics, etc. For example, the historical information may correspond to past health status values of the workload domains 129, 131, 133. The workload domain manager 208 may determine trend information based on the historical information. For example, at a first time, the workload domain manager 208 may determine that computing resources of the first workload domain 129 will exceed a computing utilization threshold at a second time, where the second time is later than the first time, based on previous values of the computing utilization. In other examples, the workload domain manager 208 may determine based on the historical information associated with the first workload domain 129 that one or more of the workload domain servers 312 are being underutilized or are not being utilized.

In some examples, the workload domain characteristics correspond to types of workloads being executed by the workload domains 129, 131, 133. For example, the workload domain characteristics of the first workload domain 129 may correspond to a type of application executed by the first workload domain 129, a quantity of resources used to execute the type of application, etc. In other examples, the workload domain characteristics correspond to a type of a resource and/or, more generally, information associated with the resource allocated to the workload domain. For example, the workload domain characteristics of the first workload domain 129 may correspond to a type of storage resources (e.g., non-volatile memory express (NVMe) storage resources, hard-disk drive storage resources, hybrid storage resources, solid-state storage resources, etc.), a quantity of the storage resources, a configuration of the storage resources, a firmware version of the storage resources, a hardware version of the storage resources, etc.

In the illustrated example of FIG. 3, the workload domain manager 208 populates the free pool 302 based on analyzing information or parameters associated with the workload domains 129, 131, 133. For example, the workload domain manager 208 may compose one or more of the free pool servers 310 based on the composition cost, the health statuses, historical information, workload domain characteristics, etc., and/or a combination thereof. In some examples, the workload domain manager 208 contracts a size of the free pool 302 (e.g., decomposing one or more of the free pool servers 310) based on the composition cost, the health statuses, historical information, workload domain characteristics, etc., and/or a combination thereof.

In FIG. 3, the example workload domain manager 208 manages the example free pool 302 based on the example policy 304. For example, the workload domain manager 208 may populate the free pool 302 with the free pool servers 310 by composing ones of the physical resources 124, 126 into virtualized servers and allocating the virtualized servers to the free pool 302 based on the policy 304. The example workload domain manager 208 may allocate one or more free pool servers 310 to the free pool 302 until a quantity of the free pool servers 310 included in the free pool 302 is greater than a minimum quantity (e.g., a minimum quantity threshold) specified by the policy 304. In other examples, the workload domain manager 208 may deallocate one or more free pool servers 310 from the free pool 302 until the quantity of free pool servers 310 included in the free pool 302 is less than a maximum quantity (e.g., a maximum quantity threshold) specified by the policy 304.

In some examples, the workload domain manager 208 obtains free pool monitoring data 314 or information associated with ones of the free pool servers 310. For example, the free pool monitoring data 314 may include a period of time one of the servers 310 has not been utilized. In other examples, the free pool monitoring data 314 may include a firmware version, a hardware version, an operating system type, an availability, a storage capacity, etc., of resources associated with the free pool servers 310. In some examples, the free pool monitoring data 314 includes identification information (e.g., workload domain identifiers, workload domain tags, etc.) that indicates which of the free pool servers 310 are associated with which of the workload domains 129, 131, 133.

In FIG. 3, the example workload domain manager 208 improves an operation of the workload domains 129, 131, 133 by dynamically adjusting an availability, a capacity, a performance, etc., of one or more workload domain servers 312 associated with one or more of the workload domains 129, 131, 133. For example, the workload domain manager 208 may generate a shadow pool 316 including one or more free pool servers 310. The example shadow pool 316 of FIG. 3 is assigned only to the third workload domain 133. For example, the free pool servers 310 included in the shadow pool 316 may not be allocated to the first workload domain 129 or the second workload domain 131. In FIG. 3, the example workload domain manager 208 can automatically allocate one or more of the example free pool servers 310 included in the example shadow pool 316 to the third workload domain 133. In some examples, each of the workload domains 129, 131, 133 have one or more corresponding shadow pools including one or more free pool servers 310.

In some examples, the workload domain manager 208 adjusts a workload domain based on health status information associated with the workload domain. For example, the workload domain manager 208 may determine an availability health status of the third workload domain 133. The availability health status may correspond to a level of redundancy of the first workload domain 129. In some examples, a level of redundancy can be characterized as a failure-to-tolerate (FTT) value (e.g., an FTT of 2, an FTT of 3, etc.). An FTT value is indicative of a quantity of hardware resources that can fail before an execution of an application is interrupted. The example workload domain manager 208 may determine that the third workload domain 133 has an availability health status of FTT=2 that is less than an availability health status threshold of FTT=3. Based on the determination, the example workload domain manager 208 may allocate one of the example free pool servers 310 included in the example shadow pool 316 to the third workload domain 133 to increase the availability health status until the availability health status satisfies the availability health status threshold (e.g., the FTT of the third workload domain 133 is FTT=3, FTT=4, etc.).

In other examples, the workload domain manager 208 may determine a capacity health status of the third workload domain 133. The capacity health status of the third workload domain 133 may correspond to a quantity of resources allocated to the third workload domain 133 (e.g., aggregate storage, aggregate CPU, etc.), a utilization of the resources allocated to the third workload domain 133 (e.g., storage utilization, CPU utilization, etc.). The example workload domain manager 208 may determine that the third workload domain 133 has a capacity health status of 90% utilization corresponding to 90% of the storage resources of the third workload domain 133 being utilized, which is greater than the capacity health status threshold of 80%. Based on the determination, the example workload domain manager 208 may allocate one or more of the example free pool servers 310 included in the example shadow pool 316 to the third workload domain 133 to decrease the capacity health status until the capacity health status becomes less than the capacity health status threshold.

In some examples, the workload domain manager 208 determines a performance health status of the third workload domain 133. The performance health status of the third workload domain 133 may correspond to the CPU operating speeds, the data access speed of mass storage, the decryption/encryption speeds of security resources, etc., of the third workload domain 133. For example, the workload domain manager 208 may obtain a performance health status of 90% of the third workload domain 133 corresponding to 90% of the CPU cycles of the third workload domain 133 being utilized. The example workload domain manager 208 may compare the performance health status of 90% to a performance health status threshold of 80% specified by the example policy 304. In response to the performance health status of 90% being greater than the performance health status threshold of 80%, the example workload domain manager 208 may allocate one or more of the example free pool servers 310 included in the example shadow pool 316 to the third workload domain 133 until the performance health status is reduced below 80%. That is, the example workload domain manager 208 allocates more free pool servers 310 to the third workload domain 133 to increase CPU availability and, thus, decrease the percentage of the total CPU cycles of the third workload domain 133 being utilized, which is reflected as a lower performance health status.

In other examples, the workload domain manager 208 may determine a performance health status of 85% corresponding to 85% of the network bandwidth of the third workload domain 133 being utilized. The example workload domain manager 208 may compare the performance health status of 85% to a performance health status threshold of 75% specified by the example policy 304. In response to the performance health status of 85% being greater than the performance health status threshold of 75%, the example workload domain manager 208 may add more bandwidth to the third workload domain 133 to increase a bandwidth (and reduce the network bandwidth utilization) of the NICs (e.g., from 2.5 Gbps to 5 Gbps, etc.) associated with the third workload domain 133. In such examples, increasing the bandwidth may also result in a dynamic bandwidth increase across a backplane of the server connections of the third workload domain 133.

In the illustrated example of FIG. 3, the example workload domain manager 208 can update a configuration, a parameter, a specification, etc., of one or more of the workload domain servers 312 by using ones of the free pool servers 310. For example, the workload domain manager 208 may update a firmware of a first one of the workload domain servers 312 included in the second workload domain 131. The example workload domain manager 208 may expand the second workload domain 131 by allocating one of the free pool servers 310 to the second workload domain 131. The example workload domain manager 208 may transfer a workload from the first one of the workload domain servers 312 to the allocated free pool server 310. In response to the transfer, the workload domain manager 208 may deallocate the first one of the workload domain servers 312 to the free pool 302. In some examples, the workload domain manager 208 can decompose the first one of the workload domain servers 312, update a firmware of the first one of the workload domain servers 312, transfer the workload domain server 312 to the first workload domain 129 or the third workload domain 133, etc.

Figure 4:
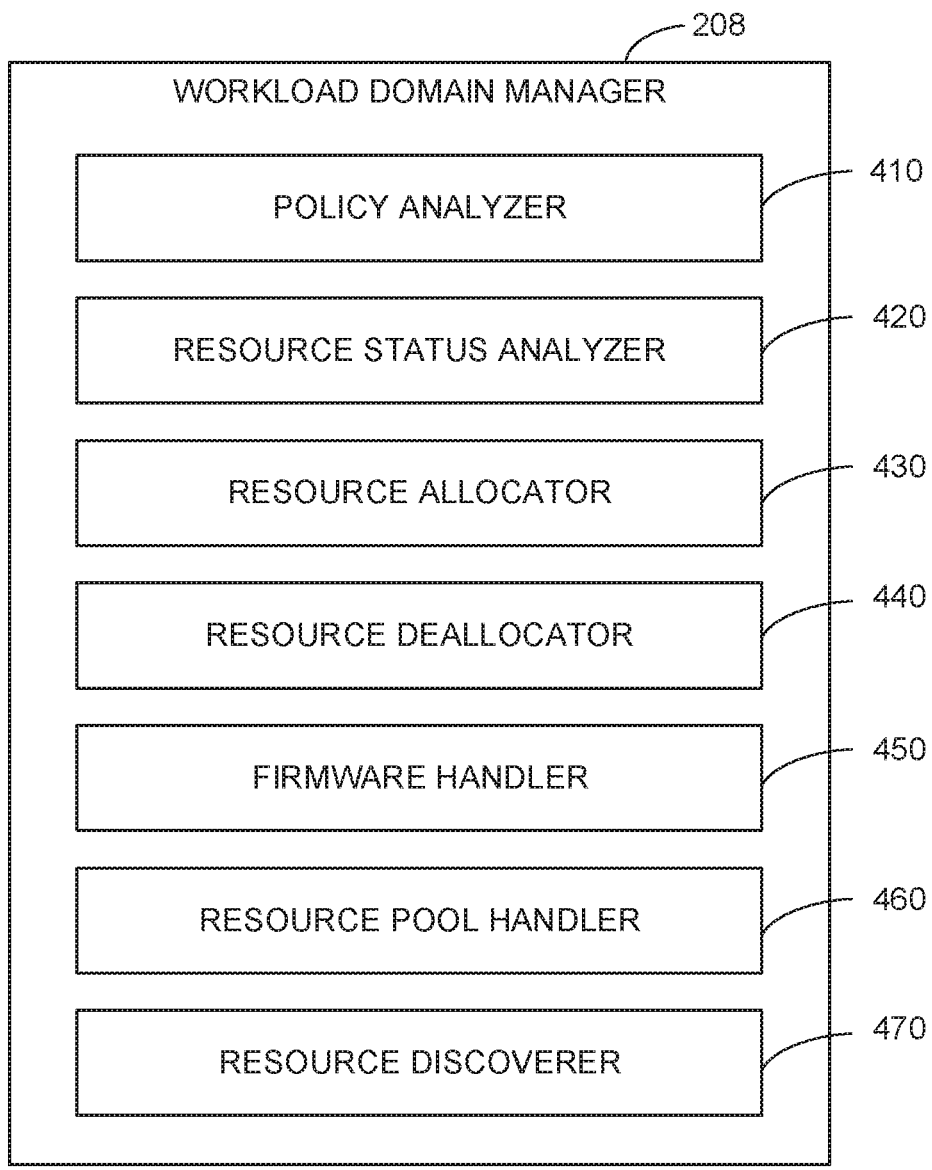
FIG. 4 is a block diagram of an example workload domain manager apparatus to manage workload domains in accordance with examples disclosed herein.

FIG. 4 is a block diagram of the example workload domain manager 208 of FIGS. 2-3. In FIG. 4, the workload domain manager 208 includes an example policy analyzer 410, an example resource status analyzer 420, an example resource allocator 430, an example resource deallocator 440, an example firmware handler 450, an example resource pool handler 460, and an example resource discoverer 470.

In the illustrated example of FIG. 4, the workload domain manager 208 includes the policy analyzer 410 to obtain and process the policy 304 of FIG. 3. In some examples, the policy analyzer 410 maps requirements, specifications, etc., from the data center operator 306, the external client 308, etc., into a quantity and/or a type of the physical resources 124, 126. For example, the policy analyzer 410 may map an availability requirement, a performance requirement, and/or a capacity requirement to the physical resources 124, 126 including storage resources, networking resources, GPU resources, security resources (e.g., firewalls, intrusion detection systems, decryption/encryption equipment, etc.). In some examples, the policy analyzer 410 creates, updates, or deletes requirements after one of the workload domains 129, 131, 133 has been deployed due to a change in requirements by the data center operator 306, the external client 308, etc.

In some examples, the policy analyzer 410 maps requirements, specifications, etc., from the data center operator 306, the external client 308, etc., into one or more policy rules used to manage the free pool 302. For example, a policy rule may correspond to a minimum quantity and/or a maximum quantity of the free pool servers 310 to be included in the free pool 302. In other examples, the policy rule may correspond to a period of time ones of the free pool servers 310 can remain in the free pool 302 prior to being decomposed. In yet other examples, the policy rule may correspond to a period of time ones of the free pool servers 310 can remain unutilized or inactive prior to being decomposed. In other examples, the policy rule may correspond to a firmware version, a hardware version, etc., of a resource. In some examples, the policy rule may correspond to a server configuration including one or more configuration parameters. For example, the configuration parameter may correspond to a quantity of storage resources, computing resources, security resources, etc. In other examples, the configuration parameter may correspond to a hardware version, a software version, etc., associated with the server.

In the illustrated example of FIG. 4, the workload domain manager 208 includes the resource status analyzer 420 to determine and monitor a health status (e.g., an availability health status, a capacity health status, a performance health status, a security health status, etc.). In some examples, the resource status analyzer 420 obtains information associated with the workload domains 129, 131, 133 of FIG. 1 and determines the health status based on the information. In some examples, the resource status analyzer 420 compares the health status to a health status threshold (e.g., an availability health status threshold, a capacity health status threshold, a performance health status threshold, a security health status threshold, etc.) where the health status thresholds are defined by and/or otherwise based on the policy 304 of FIG. 3.

In some examples, the resource status analyzer 420 selects a workload domain to process. For example, the resource status analyzer 420 may select the first workload domain 129 to process. For example, the resource status analyzer 420 may determine that the first workload domain 129 includes one or more workload domain servers 312 that are not being utilized or are being underutilized due to excess computing resources, storage resources, etc., based on a value of a corresponding health status. In such examples, the resource status analyzer 420 may direct the resource deallocator 440 to remove one or more of the workload domain servers 312 from the first workload domain 129 to the free pool 302 based on the health status associated with the one or more workload domain servers 312.

In some examples, the resource status analyzer 420 determines a health status of one or more of the workload domains 129, 131, 133 that corresponds to an operational status of one or more of the workload domain servers 312 of FIG. 3. In some examples, the operational status is a non-responsive status. For example, the non-responsive status may indicate that one of the workload domain servers 312 is non-operational, not responding to a command or query, etc. In response to determining that the example workload domain server 312 is non-responsive, the example resource status analyzer 420 may direct the example resource deallocator 440 to remove the non-responsive workload domain server 312 from the first workload domain 129. In some examples, the operational status is an active status. For example, the active status may indicate that one of the workload domain servers 312 is functioning correctly.

In some examples, the resource status analyzer 420 determines whether there is another workload domain to process. For example, the resource status analyzer 420 may determine that the second workload domain 131 has yet to be processed. In some examples, the resource status analyzer 420 selects a non-responsive workload domain server 312 to process. In some examples, the resource status analyzer 420 determines whether there is another non-responsive workload domain server 312 to process. For example, the resource status analyzer 420 may direct the resource deallocator 440 to remove a first one of the workload domain servers 312 to the free pool 302 when the first one is determined to be non-responsive. In some examples, the resource status analyzer 420 obtains a workload domain inventory. For example, the resource status analyzer 420 may obtain information associated with the workload domains 129, 131, 133. For example, the resource status analyzer 420 may determine a quantity, a type, a configuration, a specification, etc., and/or a combination thereof associated with the workload domain servers 312 included in the first workload domain 129.

In some examples, the resource status analyzer 420 right-sizes a workload domain based on information associated with the workload domain. For example, the resource status analyzer 420 may obtain a CPU utilization of each of the workload domain servers 312 included in the first workload domain 129. The example resource status analyzer 420 may determine that one or more of the workload domain servers 312 can be contracted based on a surplus or an overprovisioning of CPU resources to the first workload domain 129 based on the CPU utilization of each of the workload domain servers 312. The example resource status analyzer 420 may transfer one or more workloads from an underutilized one of the workload domain servers 312 to one or more of the other workload domain servers 312. In response to the transfer(s), the example resource status analyzer 420 may direct the example resource deallocator 440 to move the underutilized one of the workload domain servers 312 to the free pool 302. In such examples, the resource status analyzer 420 may optimize and/or otherwise improve an efficiency of allocating a right-sized quantity and/or type of resources allocated to a workload domain.

In some examples, the resource status analyzer 420 adjusts and/or otherwise modifies one of the free pool servers 310 based on the policy 304. For example, the policy analyzer 410 may obtain the policy 304 and determine a server configuration parameter (e.g., a policy configuration parameter) based on the policy 304. For example, the policy configuration parameter may correspond to the free pool server 310 including a GPU. The example resource status analyzer 420 may select one of the free pool servers 310 to process and determine a configuration parameter of the selected one of the free pool servers 310. The example resource status analyzer 420 may compare the configuration parameter to the policy configuration parameter. For example, the configuration parameter of the free pool server 310 may indicate that a GPU is not allocated to the free pool server 310 (e.g., a GPU is not listed and/or otherwise indicated by the server configuration determined by the resource status analyzer 420). The example resource status analyzer 420 may determine that the configuration parameter does not satisfy the policy configuration parameter based on the comparison. The example resource status analyzer 420 may add a resource to the free pool server 310 based on the comparison. For example, the resource status analyzer 420 may direct the resource allocator 430 to add a GPU to the free pool server 310 and update the configuration parameter to indicate that the free pool server 310 includes the GPU to satisfy the policy configuration parameter.

In the illustrated example of FIG. 4, the workload domain manager 208 includes the resource allocator 430 to add a resource to a workload domain. For example, the resource allocator 430 may direct the HMS 108, 114 of FIGS. 1-2 to add a resource to a workload domain. In some examples, the resource allocator 430 adds a resource to a workload domain during an initial deployment of the workload domain. For example, the resource allocator 430 may add a first one of the workload domain servers 312 to the first workload domain 129 during an initial deployment of the first workload domain 129. In some examples, the resource allocator 430 adds one of the free pool servers 310 to a deployed workload domain. For example, the resource allocator 430 may add one or more of the free pool servers 310 to one or more of the workload domains 129, 131, 133. In some examples, the resource allocator 430 adds a resource to one of the free pool servers 310. For example, the resource allocator 430 may add a NIC, a storage resource, a computing resource, a GPU, etc., and/or a combination thereof to one of the free pool servers 310. In such examples, the resource allocator 430 may upgrade one of the free pool servers 310 while in the composed state.

In the illustrated example of FIG. 4, the workload domain manager 208 includes the resource deallocator 440 to remove a resource from a workload domain. For example, the resource deallocator 440 may direct the HMS 108, 114 of FIGS. 1-2 to remove a resource from a workload domain. For example, the resource deallocator 440 may direct the HMS 108, 114 to remove a computing resource, a storage resource, etc., from one of the workload domain servers 312. In some examples, the resource deallocator 440 removes one of the workload domain servers 312 included in one or more of the workload domains 129, 131, 133 to the free pool 302. For example, the resource deallocator 440 may remove one or more of the workload domain servers 312 included in the first workload domain 129 to the free pool 302. In some examples, the resource deallocator 440 removes a resource from one of the free pool servers 310. For example, the resource deallocator 440 may remove a NIC, a storage resource, a computing resource, a GPU, etc., and/or a combination thereof from one of the free pool servers 310. In such examples, the resource deallocator 440 may contract one of the free pool servers 310 while in the composed state. In some examples, the resource deallocator 440 maintains one of the transferred workload domain servers 312 in the free pool 302 to determine if the transferred workload domain server 312 can be used by another workload domain instead of decomposing the transferred workload domain server 312.

In the illustrated example of FIG. 4, the workload domain manager 208 includes the firmware handler 450 to facilitate firmware or software updates to the workload domain servers 312 included in the workload domains 129, 131, 133. In some examples, the firmware handler 450 obtains a firmware upgrade schedule corresponding to a time table and/or an order of execution to which the workload domain servers 312 can be upgraded to a new firmware version. For example, the firmware upgrade schedule may be included in and/or otherwise based on the policy 304. In other examples, the firmware upgrade schedule may be obtained from the data center operator 306 and/or the external client 308.

In some examples, the firmware handler 450 selects non-upgraded servers included in the workload domains 129, 131, 133 to process. For example, the firmware handler 450 may select a first one of the workload domain servers 312 that has not yet been upgraded to a new firmware version. In some examples, the firmware handler 450 determines whether firmware of the selected workload domain server 312 can be upgraded. For example, the firmware handler 450 may select a first one of the workload domain servers 312 included in the first workload domain 129 that cannot be upgraded in a composed state. In such examples, the firmware handler 450 may instruct the resource deallocator 440 to transfer the non-upgraded workload domain server 312 to the free pool 302 for processing. Prior to the transfer, the example firmware handler 450 may add one of the free pool servers 310 to the first workload domain 129, transfer a workload of the non-upgraded workload domain server 312 to the free pool server 310, and transfer the non-upgraded workload domain server 312 to the free pool 302. In some examples, the firmware handler 450 upgrades the non-upgraded workload domain server 312 in the composed state while the non-upgraded workload domain server 312 is in the free pool 302. In other examples, the firmware handler 450 upgrades the non-upgraded workload domain server 312 in the composed state while the non-upgraded workload domain server 312 remains in the first workload domain 129.

In the illustrated example of FIG. 4, the workload domain manager 208 includes the resource pool handler 460 to populate, contract, and/or otherwise monitor the free pool 302 of FIG. 3. In some examples, the resource pool handler 460 compares a quantity of the free pool servers 310 to a minimum quantity specified in a policy rule based on the policy 304. The example resource pool handler 460 may instruct the example resource allocator 430 to compose and add one or more servers to the free pool 302 to satisfy the minimum quantity. In some examples, the resource pool handler 460 compares a quantity of the free pool servers 310 to a maximum quantity specified in a policy rule based on the policy 304. The example resource pool handler 460 may instruct the example resource deallocator 440 to decompose one or more of the free pool servers 310 to satisfy the maximum quantity.

In some examples, the resource pool handler 460 compares a quantity of time ones of the free pool servers 310 are inactive or not utilized to an inactive time threshold specified by a policy rule based on the policy 304. For example, the resource pool handler 460 may instruct the resource deallocator 440 to decompose one or more of the free pool servers 310 when the one or more free pool servers 310 have been inactive for a period of time greater than the inactive time threshold.

In some examples, the resource pool handler 460 generates and/or otherwise populates the free pool 302 based on analyzing information or parameters associated with the workload domains 129, 131, 133. For example, the resource pool handler 460 may instruct the resource allocator 430 to compose one or more of the free pool servers 310 based on the composition cost, the health statuses, historical information, workload domain characteristics, etc., and/or a combination thereof. In some examples, the resource pool handler 460 may direct the resource deallocator 440 to contract a size of the free pool 302 (e.g., decomposing one or more of the free pool servers 310) based on the composition cost, the health statuses, historical information, workload domain characteristics, etc., and/or a combination thereof.

In some examples, the resource pool handler 460 instructs the resource deallocator 440 to disassemble the free pool 302 by decomposing all of the free pool servers 310. For example, the resource pool handler 460 may determine to breakdown the free pool 302 when the associated workload domains 129, 131, 133 have satisfied one or more health status thresholds for a specified period of time (e.g., as defined by the policy 304), one or more health statuses have satisfied a decomposition threshold, etc. In some examples, the policy analyzer 410 determines a decomposition threshold based on the policy 304. For example, the policy 304 may specify a storage utilization threshold of 80%. The example policy analyzer 410 may use the storage utilization of 80% to determine the decomposition threshold to be 60% based on the example policy 304. For example, the policy analyzer 410 may determine the decomposition threshold to be less than the storage utilization threshold by a specified quantity (e.g., decomposition threshold is 20% less than the storage utilization), a specified factor (e.g., decomposition threshold is 0.75 or 75% of the storage utilization), etc., to ensure that the free pool 302 is dissolved when the workload domains 129, 131, 133 do not have health statuses proximate the thresholds defined and/or otherwise based on the policy 304. For example, the specified quantity, the specified factor, etc., may be specified and/or otherwise defined by the policy 304.

In some examples, the resource pool handler 460 populates the free pool 302 prior to one or more of the workload domains 129, 131, 133 satisfying one or more health status thresholds. For example, the resource pool handler 460 may estimate and/or otherwise predict one or more of the workload domains 129, 131, 133 needing one or more free pool servers 310 to be allocated to the one or more workload domains 129, 131, 133 prior to the one or more workload domains 129, 131, 133 satisfying one or more health status thresholds. In some examples, the resource pool handler 460 populates the free pool 302 after one or more of the workload domains 129, 131, 133 satisfy one or more health status thresholds.

In the illustrated example of FIG. 4, the workload domain manager 208 includes the resource discoverer 470 to discover or poll available ones of the physical resources 124, 126 to be composed into a virtualized server. For example, the resource discoverer 470 may direct the HMS 108, 114 of FIGS. 1-2 to poll the physical resources 124, 126 of the physical racks 102, 104 of FIG. 1 to determine ones of the physical resources 124, 126 not allocated to a workload domain. Additionally or alternatively, the resource discoverer 470 may poll ones of the physical resources 124, 126 that are allocated to a workload domain.

In some examples, the resource discoverer 470 determines whether there are available resources to compose servers based on a policy. For example, the resource discoverer 470 may poll available ones of the physical resources 124, 126 to determine whether servers can be composed to comply with the policy 304. For example, the resource discoverer 470 may determine that a server is to include at least a first quantity of processors (e.g., a quantity of GHz), a second quantity of memory (e.g., a quantity of TB storage, a quantity of GB RAM, etc.), and a third quantity of network resources (e.g., NICs) based on the policy 304. The example resource discoverer 470 may determine whether the physical resources 124, 126 include available resources to supply and/or otherwise satisfy the first, second, and third quantities. In some examples, the resource discoverer 470 generates an alert to the data center operator 306, the external client 308, etc., indicating that available resources are not available to compose resources based on the policy 304.

While an example manner of implementing the example workload domain manager 208 of FIGS. 2-3 is illustrated in FIG. 4, one or more of the elements, processes, and/or devices illustrated in FIG. 4 may be combined, divided, re-arranged, omitted, eliminated, and/or implemented in any other way. Further, the example policy analyzer 410, the example resource status analyzer 420, the example resource allocator 430, the example resource deallocator 440, the example firmware handler 450, the example resource pool handler 460, the example resource discoverer 470, and/or, more generally, the example workload domain manager 128 of FIGS. 2-3 may be implemented by hardware, software, firmware, and/or any combination of hardware, software, and/or firmware. Thus, for example, any of the example policy analyzer 410, the example resource status analyzer 420, the example resource allocator 430, the example resource deallocator 440, the example firmware handler 450, the example resource pool handler 460, the example resource discoverer 470, and/or, more generally, the example workload domain manager 208 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example policy analyzer 410, the example resource status analyzer 420, the example resource allocator 430, the example resource deallocator 440, the example firmware handler 450, the example resource pool handler 460, and/or the example resource discoverer 470 is/are hereby expressly defined to include a non-transitory computer readable storage device or storage disk such as a memory, a digital versatile disk (DVD), a compact disk (CD), a Blu-ray disk, etc., including the software and/or firmware. Further still, the example workload domain manager 208 of FIGS. 2-3 may include one or more elements, processes, and/or devices in addition to, or instead of, those illustrated in FIG. 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the workload domain manager 208 of FIGS. 2-4 are shown in FIGS. 5-10. The machine readable instructions may be one or more executable program(s) or portion(s) of one or more executable program(s) for execution by a computer processor such as the processor 1112 shown in the example processor platform 1100 discussed below in connection with FIG. 11. The program(s) may be embodied in software stored on a non-transitory computer readable storage medium such as a CD-ROM, a floppy disk, a hard drive, a DVD, a Blu-ray disk, or a memory associated with the processor 1112, but the entire program(s) and/or parts thereof could alternatively be executed by a device other than the processor 1112 and/or embodied in firmware or dedicated hardware. Further, although the example program(s) is/are described with reference to the flowcharts illustrated in FIGS. 5-10, many other methods of implementing the example workload domain manager 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 5:
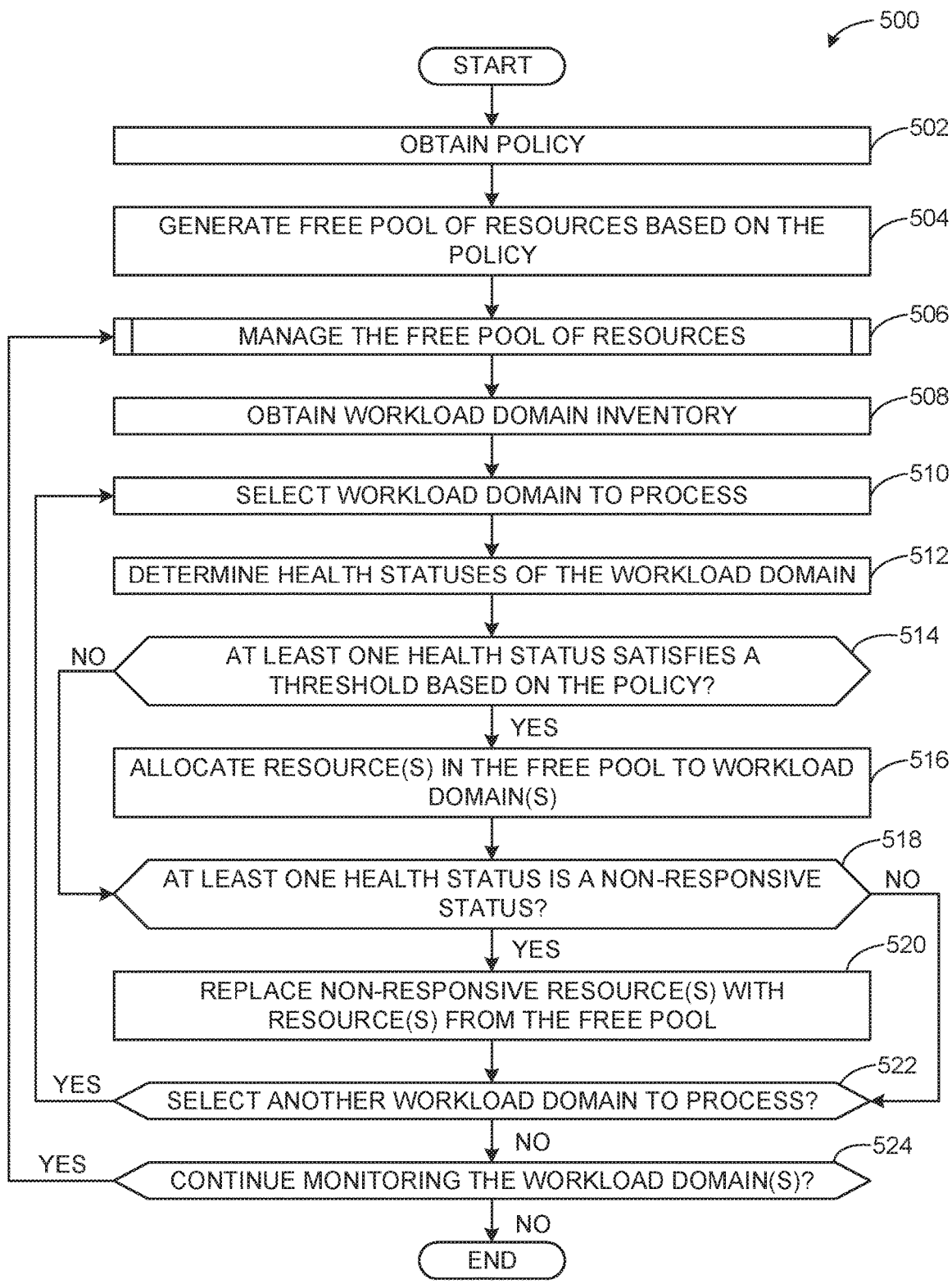
FIG. 5 is a flowchart representative of example machine readable instructions which may be executed to implement the example workload domain manager apparatus of FIG. 4 to populate and manage a free pool of resources to be allocated to a workload domain

FIG. 5 is a flowchart representative of example machine readable instructions 500 which may be executed to implement the example workload domain manager 208 of FIGS. 2-4 to populate and manage a free pool of resources to be allocated to a workload domain. The example machine readable instructions 500 begin at block 502 at which the example workload domain manager 208 obtains a policy. For example, the policy analyzer 410 (FIG. 4) may obtain the policy 304 of FIG. 3 including a requirement, a specification, etc., associated with one or more of the workload domains 129, 131, 133, the free pool 302, etc.

At block 504, the example workload domain manager 208 generates a free pool of resources based on the policy. For example, the resource pool handler 460 (FIG. 4) may instruct the resource allocator 430 (FIG. 4) to compose and add the plurality of the free pool servers 310 of FIG. 3 to the free pool 302. In such examples, the resource pool handler 460 determines a quantity of the free pool servers 310 and/or a configuration, a type, etc., of each of the free pool servers 310 to be composed based on a computation cost, historical information, a health status, etc., and/or a combination thereof.

At block 506, the example workload domain manager 208 manages the free pool of resources. For example, the resource pool handler 460 may instruct the resource deallocator 440 (FIG. 4) to decompose one or more of the free pool servers 310 in the free pool 302 based on a policy rule. An example process that can be used to implement block 506 is described below in connection with FIG. 6.

At block 508, the example workload domain manager 208 obtains a workload domain inventory. For example, the resource status analyzer 420 (FIG. 4) may obtain a workload domain inventory of one or more of the workload domains 129, 131, 133 of FIG. 1. For example, the resource status analyzer 420 may determine a quantity and/or a type of the workload domain servers 312 of FIG. 3 allocated to the workload domains 129, 131, 133.

At block 510, the example workload domain manager 208 selects a workload domain to process. For example, the resource status analyzer 420 may select the first workload domain 129 to process.

At block 512, the example workload domain manager 208 determines health statuses of the workload domain. For example, the resource status analyzer 420 may determine an availability health status, a capacity health status, a performance health status, etc., associated with the first workload domain 129. For example, the resource status analyzer 420 may determine a performance health status of 85% storage utilization corresponding to 80% of the storage resources associated with the workload domain servers 312 included in the first workload domain 129 being utilized. In other examples, the resource status analyzer 420 may determine an operational status associated with the first workload domain 129 to determine whether one or more of the workload domain servers 312 have an active status, a non-responsive status, etc.

At block 514, the example workload domain manager 208 determines whether at least one health status satisfies a threshold based on the policy. For example, the resource status analyzer 420 may compare the performance health status of 85% to a performance health status threshold of 80% and determine that the performance health status satisfies the performance health status threshold based on the performance health status being greater than the performance health status threshold.

If, at block 514, the example workload domain manager 208 determines that none of the health statuses satisfy the respective thresholds based on the policy, control proceeds to block 518 to determine whether at least one health status is a non-responsive status. If, at block 514, the example workload domain manager 208 determines that one or more of the health statuses satisfy the respective thresholds based on the policy, then, at block 516, the workload domain manager 208 allocates resource(s) in the free pool to the workload domain(s). For example, the resource allocator 430 may allocate one or more of the free pool servers 310 to the first workload domain 129.

At block 518, the example workload domain manager 208 determines whether at least one health status is a non-responsive status. For example, the resource status analyzer 420 may determine that one or more of the workload domain servers 312 included in the first workload domain 129 is non-responsive or has a non-responsive status. For example, the resource status analyzer 420 may determine that one of the workload domain servers 312 is not responding to a command and/or a query.

If, at block 518, the example workload domain manager 208 determines that none of the health statuses is a non-responsive status, control proceeds to block 522 at which the workload domain manager 208 determines whether to select another workload domain to process. If, at block 518, the example workload domain manager 208 determines that one or more of the health statuses is a non-responsive status, then, at block 520, the workload domain manager 208 replaces the non-responsive resource(s) with resource(s) from the free pool. For example, the resource allocator 430 may allocate one or more of the free pool servers 310 to the first workload domain 129 and the resource deallocator 440 may deallocate the non-responsive workload domain servers 312.

At block 522, the example workload domain manager 208 determines whether to select another workload domain to process. For example, the resource status analyzer 420 may determine to select the second workload domain 131 to process.

If, at block 522, the example workload domain manager 208 determines to select another workload domain to process, control returns to block 510 to select another workload domain to process. If, at block 522, the example workload domain manager 208 determines not to select another workload domain to process, then, at block 524, the workload domain manager 208 determines whether to continue monitoring the workload domain(s). For example, the resource status analyzer 420 may determine not to continue monitoring the workload domains 129, 131, 133 of FIGS. 1 and 3.

If, at block 524, the example workload domain manager 208 determines to continue monitoring the workload domain(s), control returns to block 506 to manage the free pool of resources. If, at block 524, the example workload domain manager 208 determines not to continue monitoring the workload domain(s), the example machine readable instructions 500 of FIG. 5 conclude.

Figure 6:
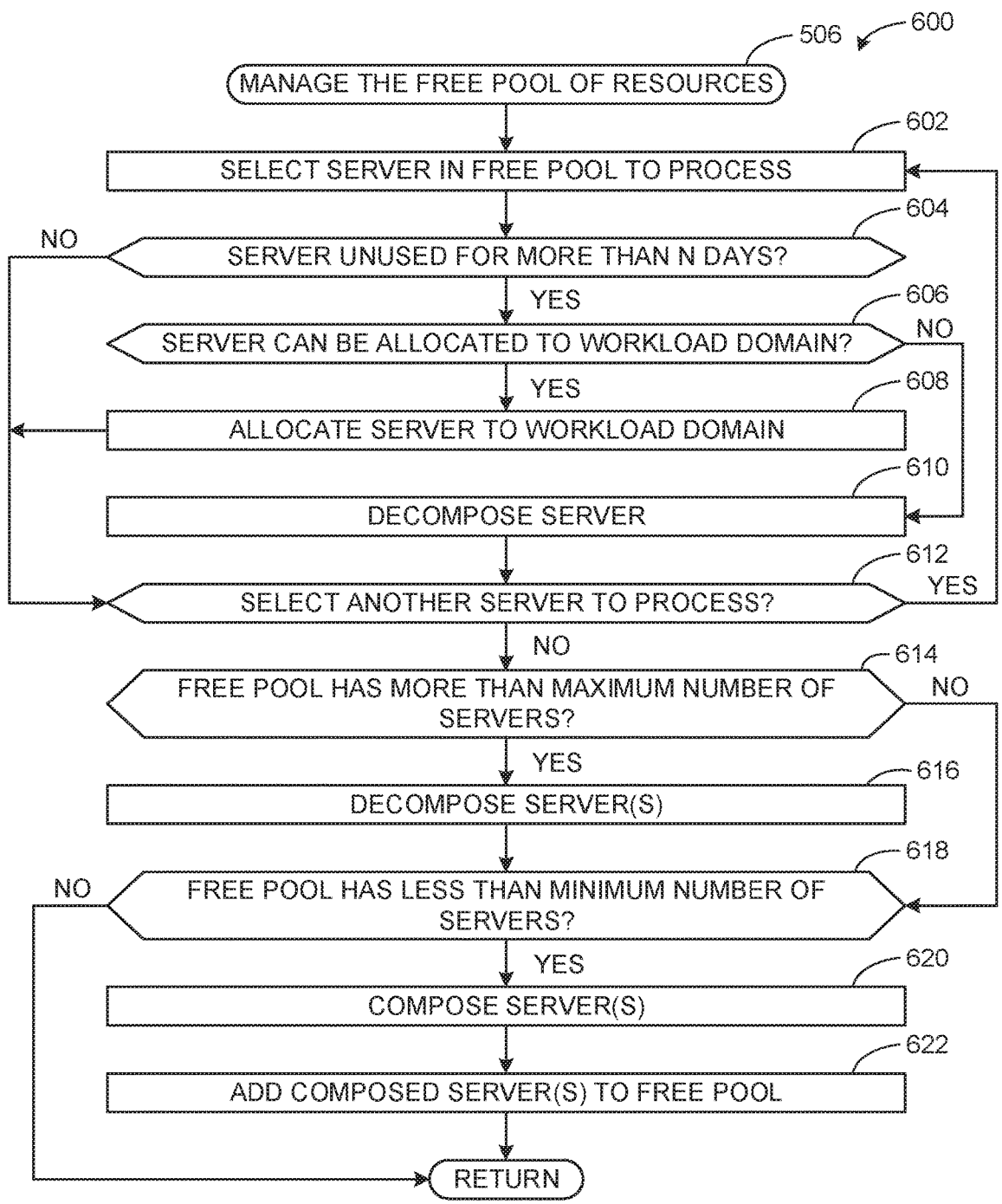
FIG. 6 is a flowchart representative of example machine readable instructions which may be executed to implement the example workload domain manager apparatus of FIG. 4 to manage a free pool of resources.

FIG. 6 is a flowchart representative of example machine readable instructions 600 which may be executed to implement the example workload domain manager 208 of FIGS. 2-4 to manage the free pool of resources. The example machine readable instructions 600 can be used to implement block 506 of the example machine readable instructions 500 of FIG. 5. The example machine readable instructions 600 begin at block 602, at which the example workload domain manager 208 selects a server in the free pool to process. For example, the resource pool handler 460 (FIG. 4) may select a first one of the free pool servers 310 included in the shadow pool 316 of the free pool 302 of FIG. 3 to process.

At block 604, the example workload domain manager 208 determines whether the server has been unused for more than N number of days. For example, the resource pool handler 460 may compare a quantity of days the first one of the free pool servers 310 has not been utilized to a quantity of days specified by a policy rule defined the policy 304 of FIG. 4.

If, at block 604, the example workload domain manager 208 determines that the server has not been unused for more than N number of days, control proceeds to block 612 to determine whether to select another server to process. If, at block 604, the example workload domain manager 208 determines that the server has been unused for more than N number of days, then, at block 606, the workload domain manager 208 determines whether the server can be allocated to a workload domain. For example, the resource status analyzer 420 (FIG. 4) may determine that the first one of the free pool servers 310 can be removed from the shadow pool 316 and allocated to the second workload domain 131, the third workload domain 133, etc.

If, at block 606, the example workload domain manager 208 determines that the server can be allocated to a workload domain, then, at block 608, the workload domain manager 208 allocates the server to the workload domain. For example, the resource allocator 430 (FIG. 4) may allocate the first one of the free pool servers 310 to the second workload domain 131, a shadow pool assigned to the second workload domain 131, etc. In response to allocating the server to the workload domain, the example workload domain manager 208 proceeds to block 612 to determine whether to select another server to process.

If, at block 606, the example workload domain manager 208 determines that the server cannot be allocated to a workload domain, control proceeds to block 610 to decompose the server. For example, the resource deallocator 440 (FIG. 4) may decompose the first one of the free pool servers 310. In response to decomposing the server, the example workload domain manager 208 determines whether to select another server to process at block 612. For example, the resource pool handler 460 (FIG. 4) may determine to process a second one of the free pool servers 310 included in the shadow pool 316 of the free pool 302 of FIG. 3 to process. Alternatively, the example resource pool handler 460 may determine to process a third one of the free pool servers 310 that is not included in the shadow pool 316.

If, at block 612, the example workload domain manager 208 determines to select another server to process, control returns to block 602 to select another server in the free pool to process. If, at block 612, the example workload domain manager 208 determines not to select another server to process, then, at block 614, the workload domain manager 208 determines whether the free pool has more than a maximum number of servers. For example, the resource pool handler 460 may compare a quantity of the free pool servers 310 included in the free pool 302 to a maximum quantity of servers (e.g., a maximum quantity threshold) specified by a policy rule based on the policy 304 of FIG. 3. In such an example, the resource pool handler 460 may determine that the quantity of the free pool servers 310 is greater than the maximum quantity based on the comparison.

If, at block 614, the example workload domain manager 208 determines that the free pool does not have more than the maximum number of servers, control proceeds to block 618 to determine whether the free pool has less than a minimum number of servers. If, at block 614, the example workload domain manager 208 determines that the free pool does have more than the maximum number of servers, then, at block 616, the workload domain manager 208 decomposes server(s). For example, the resource deallocator 440 may decompose one or more of the free pool servers 310 to reduce a quantity of the free pool servers 310 to less than the maximum number of servers.

At block 616, the example workload domain manager 208 determines whether the free pool has less than a minimum number of servers. For example, the resource pool handler 460 may compare a quantity of the free pool servers 310 included in the free pool 302 to a minimum quantity of servers (e.g., a minimum quantity threshold) specified by a policy rule based on the policy 304 of FIG. 3. In such an example, the resource pool handler 460 may determine that the quantity of the free pool servers 310 is less than the minimum quantity based on the comparison.

If, at block 618, the example workload domain manager 208 determines that the free pool does not have less than the minimum number of servers, the example process of FIG. 6 ends and control returns to a calling process or function such as the example process of FIG. 5. For example, control returns to the machine readable instructions 500 of FIG. 5 at which the workload domain manager 208 obtains a workload domain inventory at block 508. If, at block 618, the example workload domain manager 208 determines that the free pool does have less than the minimum number of servers, then, at block 620, the workload domain manager 208 composes server(s). For example, the resource allocator 430 may compose ones of the physical resources 124, 126 of FIG. 1 into one or more of the free pool servers 310.

At block 622, the example workload domain manager 208 adds the composed server(s) to the free pool. For example, the resource allocator 430 may add the one or more composed free pool servers 310 to the free pool 302 to increase a quantity of the free pool servers 310 to more than the minimum number of servers specified by the policy rule. In response to adding the composed server(s) to the free pool, the example process of FIG. 6 ends and control returns to a calling process or function such as the example machine readable instructions 500 of FIG. 5.

Figure 7:
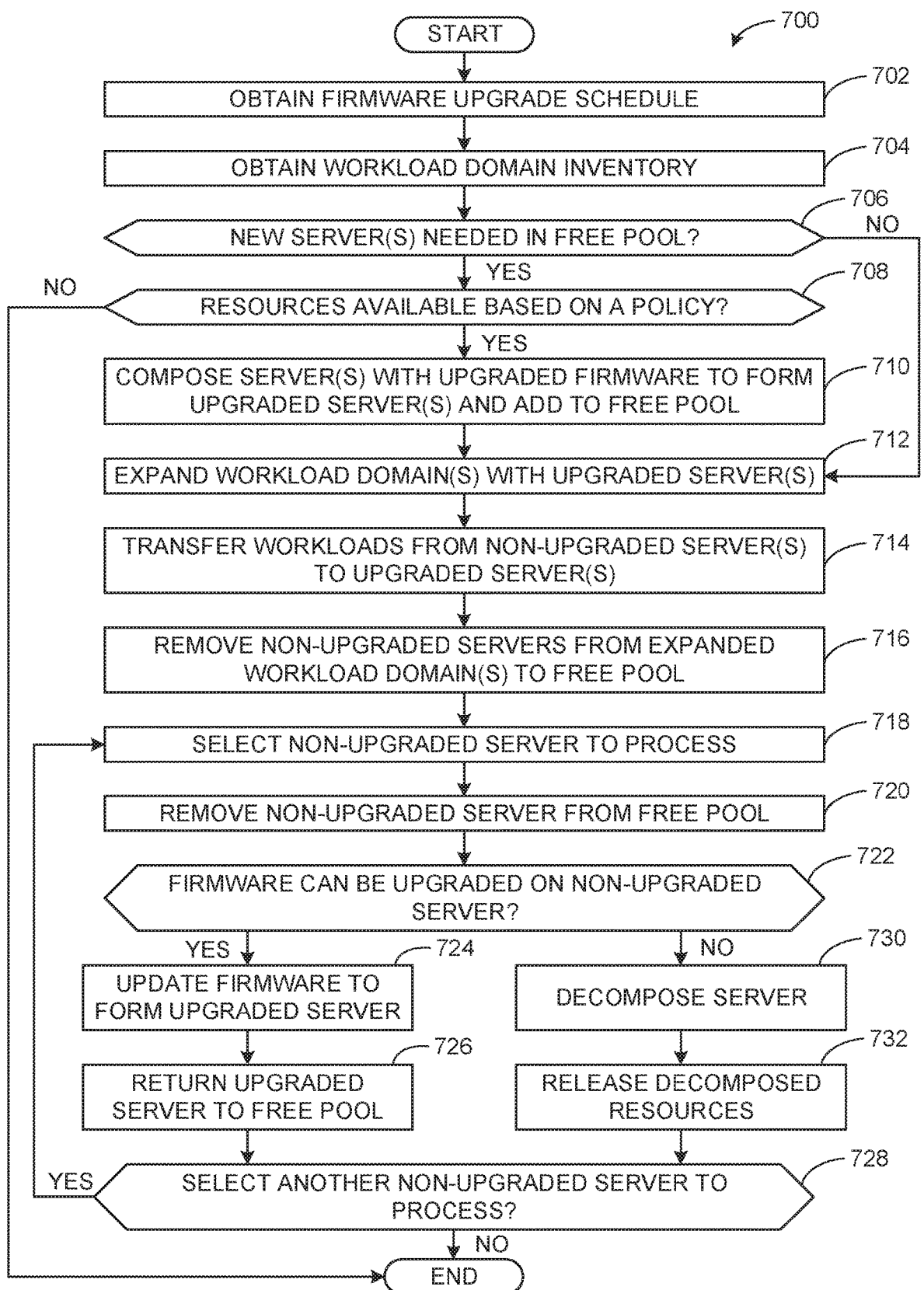
FIG. 7 is a flowchart representative of example machine readable instructions which may be executed to implement the example workload domain manager apparatus of FIG. 4 to upgrade firmware of a workload domain server in a workload domain.

FIG. 7 is a flowchart representative of example machine readable instructions 700 which may be executed to implement the example workload domain manager 208 of FIGS. 2-4 to upgrade firmware of a workload domain server in a workload domain. The example machine readable instructions 700 begin at block 702, at which the example workload domain manager 208 obtains a firmware upgrade schedule. For example, the firmware handler 450 (FIG. 4) may obtain a firmware upgrade schedule corresponding to upgrading one or more of the workload domain servers 312 included in one or more of the workload domains 129, 131, 133 of FIG. 3.

At block 704, the example workload domain manager 208 obtains a workload domain inventory. For example, the resource status analyzer 420 may obtain a workload domain inventory of one or more of the workload domains 129, 131, 133 of FIG. 1. For example, the resource status analyzer 420 (FIG. 4) may obtain the workload domain inventory by determining a quantity and/or a type of the workload domain servers 312 of FIG. 3 allocated to the workload domains 129, 131, 133.

At block 706, the example workload domain manager 208 determines whether new server(s) are needed in the free pool. For example, the resource pool handler 460 (FIG. 4) may determine that there are not enough free pool servers 310 included in the free pool 302 with a latest version of the firmware to complete the firmware upgrade schedule based on the workload domain inventory. In response to at least the determination, the resource pool handler 460 may instruct the resource allocator 430 (FIG. 4) to compose new servers with the latest firmware version and add them to the free pool 302 at block 708. In other examples, the resource pool handler 460 may determine at block 706 that there are enough free pool servers 310 included in the free pool 302 with the latest firmware version to complete the firmware upgrade schedule based on the workload domain inventory.

If, at block 706, the example workload domain manager 208 determines that new server(s) are not needed in the free pool, control proceeds to block 712 to expand workload domain(s) with upgraded server(s). If, at block 706, the example workload domain manager 208 determines that new server(s) are needed in the free pool, then, at block 708, the workload domain manager 208 determines whether resources are available based on a policy. For example, the resource discoverer 470 (FIG. 4) may poll available ones of the physical resources 124, 126 of FIGS. 1 and 3 to determine whether servers can be composed in accordance with the policy 304 of FIG. 3. For example, the resource discoverer 470 may determine that a first quantity of storage resources (e.g., 100 GB, 1 TB, 10 TB, etc.) and/or a first type of the storage resources (e.g., HDD, SSD, NVMe, etc.) is needed to compose one or more servers based on the policy 304. The example resource discoverer 470 may query the physical resources 124, 126 to determine if there are enough available ones of the physical resources 124, 126 corresponding to the first quantity and/or the first type to compose the one or more servers.

If, at block 708, the example workload domain manager 208 determines that resources are not available based on the policy, the example machine readable instructions 700 conclude. For example, the resource discoverer 470 may generate an alert to the data center operator 306, the external client 308, etc., indicating that there are no available resources to compose servers based on the policy 304.

If, at block 708, the example workload domain manager 208 determines that resources are available based on the policy, then, at block 710, the workload domain manager 208 composes server(s) with upgraded firmware to form upgraded server(s) and add to the free pool. For example, the resource allocator 430 may compose ones of the physical resources 124, 126 with a latest version of the firmware (e.g., resources with the latest firmware version already installed) to generate upgraded servers and add the upgraded servers to the free pool 302 to become free pool servers 310. Alternatively, the example resource allocator 430 may compose a server including resources with non-upgraded firmware and instruct the firmware handler 450 to upgrade the firmware on the resources. Alternatively, the example firmware handler 450 (FIG. 4) may upgrade firmware on ones of the physical resources 124, 126 prior to the example resource allocator 430 composing one or more servers using the resources with the upgraded firmware.

At block 712, the example workload domain manager 208 expands workload domain(s) with the upgraded server(s). For example, the resource allocator 430 may expand the first workload domain 129 by allocating one or more upgraded servers included in the free pool 302 to the first workload domain 129.

At block 714, the example workload domain manager 208 transfers workloads from non-upgraded server(s) to the upgraded server(s). For example, the resource allocator 430 may transfer a workload from a non-upgraded workload domain server 312 included in the first workload domain 129 to one of the upgraded servers added to the first workload domain 129.

At block 716, the example workload domain manager 208 removes the non-upgraded servers from the expanded workload domain(s) to the free pool. For example, the resource deallocator 440 may remove one or more non-upgraded servers from the workload domains 129, 131, 133 to the free pool 302.

At block 718, the example workload domain manager 208 selects a non-upgraded server to process. For example, the firmware handler 450 selects a first one of the non-upgraded servers in the free pool 302 to process.

At block 720, the example workload domain manager 208 removes the non-upgraded server from the free pool. For example, the resource deallocator 440 may remove the non-upgraded server from the free pool 302.

At block 722, the example workload domain manager 208 determines whether the firmware can be upgraded on the non-upgraded server. For example, the firmware handler 450 may not be able to upgrade the firmware of the non-upgraded server while the non-upgraded server is in the composed state.

If, at block 722, the example workload domain manager 208 determines that the firmware can be upgraded on the non-upgraded server, then, at block 724, the workload domain manager 208 updates the firmware to form an upgraded server. For example, the firmware handler 450 may upgrade the non-upgraded server to the latest version of the firmware while the non-upgraded server is in the composed state.

At block 726, the example workload domain manager 208 returns the upgraded server to the free pool. For example, the resource allocator 430 may return the upgraded server to the free pool 302. In response to returning the upgraded server to the free pool, the example workload domain manager 208 determines whether to select another non-upgraded server to process at block 728.

If, at block 722, the example workload domain manager 208 determines that the firmware cannot be upgraded on the non-upgraded server, then, at block 730, the workload domain manager 208 decomposes the server. For example, the resource deallocator 440 (FIG. 4) may decompose the non-upgraded server.

At block 732, the example workload domain manager 208 releases the decomposed resources. For example, the resource deallocator 440 may release the resources from the decomposed server and make the released resources available for use in other compositions (e.g., available to be composed in another server). In response to releasing the decomposed resources, the example workload domain manager 208 determines whether to select another non-upgraded server to process. For example, the firmware handler 450 may select a second one of the non-upgraded servers in the free pool 302 to process.

If, at block 728, the example workload domain manager 208 determines to select another non-upgraded server to process, control returns to block 718 to select another non-upgraded server to process. If, at block 728, the example workload domain manager 208 determines not to select another non-upgraded server to process, the example machine readable instructions 700 of FIG. 7 conclude.

Figure 8:
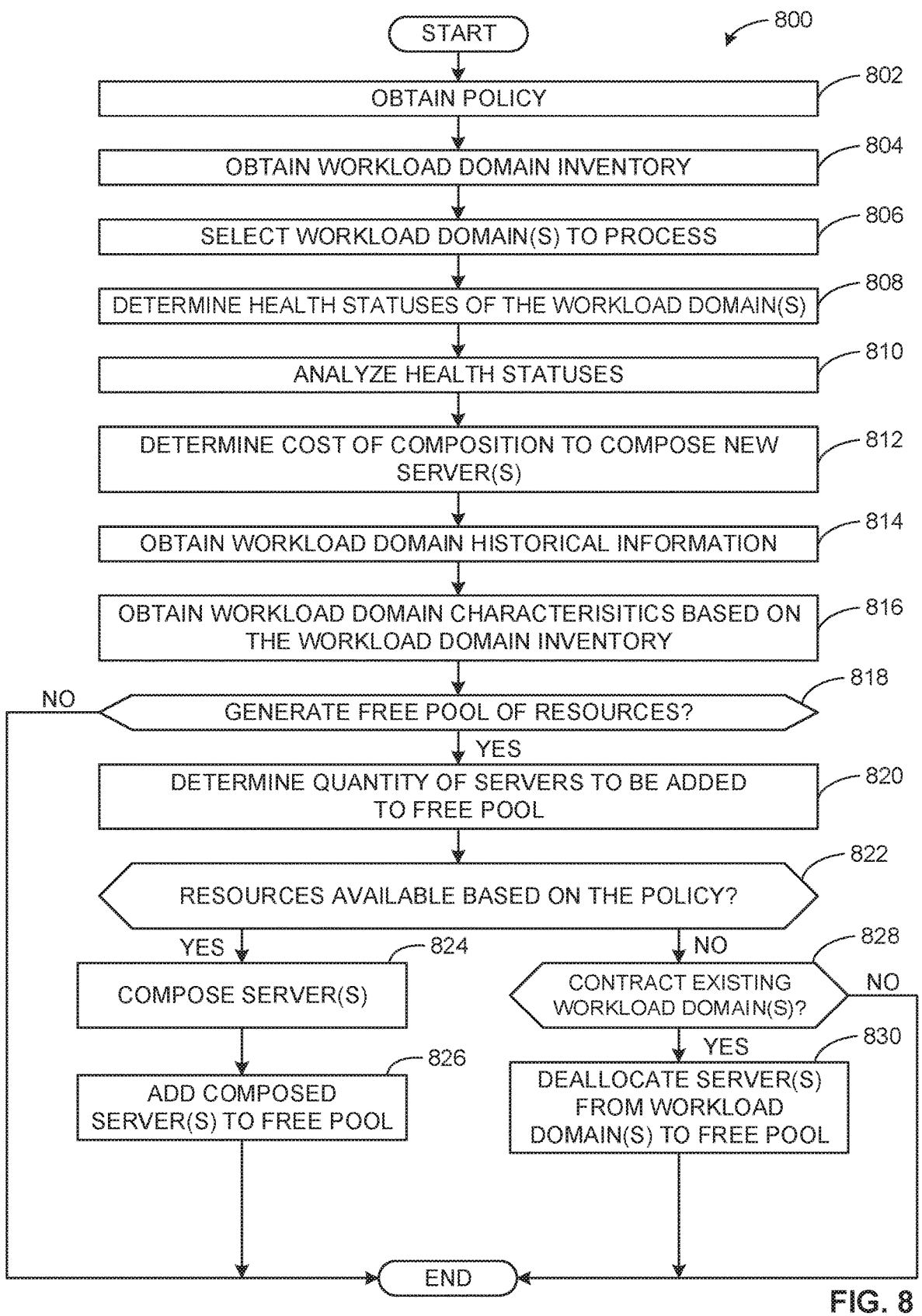
FIG. 8 is a flowchart representative of example machine readable instructions which may be executed to implement the example workload domain manager apparatus of FIG. 4 to populate a free pool of resources.

FIG. 8 is a flowchart representative of example machine readable instructions 800 which may be executed to implement the example workload domain manager 208 of FIGS. 2-4 to populate a free pool of resources. The example machine readable instructions 800 begin at block 802, at which the example workload domain manager 208 obtains a policy. For example, the policy analyzer 410 (FIG. 4) may obtain the policy 304 of FIG. 3 including a requirement, a specification, etc., associated with one or more of the workload domains 129, 131, 133, the free pool 302, etc., of FIGS. 1 and 3.

At block 804, the example workload domain manager 208 obtains a workload domain inventory. For example, resource status analyzer 420 (FIG. 4) may obtain a workload domain inventory of one or more of the workload domains 129, 131, 133 of FIG. 1. For example, the resource status analyzer 420 may determine a quantity and/or a type of the workload domain servers 312 of FIG. 3 allocated to the workload domains 129, 131, 133.

At block 806, the example workload domain manager 208 selects workload domain(s) to process. For example, the resource status analyzer 420 may select one or more of the workload domains 129, 131, 133 to process. Additionally or alternatively, the example machine readable instructions 800 may be iteratively executed for each of the workload domains 129, 131, 133.

At block 808, the example workload domain manager 208 determines health statuses of the workload domain. For example, the resource status analyzer 420 may determine an availability health status, a capacity health status, a performance health status, etc., associated with the first workload domain 129. For example, the resource status analyzer 420 may determine a performance health status of 85% storage utilization corresponding to 80% of the storage resources associated with the workload domain servers 312 included in the first workload domain 129 being utilized. In other examples, the resource status analyzer 420 may determine an operational status associated with the first workload domain 129 to determine whether one or more of the workload domain servers 312 have an active status, a non-responsive status, etc.

At block 810, the example workload domain manager 208 analyzes the health statuses. For example, the resource status analyzer 420 may determine whether a health status is trending towards exceeding a corresponding health status threshold. In other examples, the resource status analyzer 420 may determine whether a health status satisfies a corresponding health status threshold.

At block 812, the example workload domain manager 208 determines a cost of composition to compose new server(s). For example, the resource pool handler 460 (FIG. 4) may determine a composition cost to compose a new server based on the policy 304, an availability of the physical resources 124, 126, etc.

At block 814, the example workload domain manager 208 obtains workload domain historical information. For example, the resource pool handler 460 may obtain historical data or information associated with one or more of the workload domains 129, 131, 133 of FIGS. 1 and 3 from the one or more workload domains 129, 131, 133. For example, the resource pool handler 460 may obtain prior availability health statuses, capacity health statuses, etc., associated with the first workload domain 129 from the first workload domain 129.

At block 816, the example workload domain manager 208 obtains workload domain characteristics based on the workload domain inventory. For example, the resource pool handler 460 may obtain workload domain characteristics associated with one or more of the workload domains 129, 131, 133 of FIGS. 1 and 3 from the one or more workload domains 129, 131, 133. For example, the resource pool handler 460 may determine a quantity, a type, a firmware version, etc., of one or more resources associated with the first workload domain 129 based on the workload domain inventory corresponding to the first workload domain 129.

At block 818, the example workload domain manager 208 determines whether to generate a free pool of resources. For example, the resource pool handler 460 may determine to generate the free pool 302 based on one or more of the health statuses, the composition cost, the workload domain historical information, the workload domain characteristics, etc., associated with one or more of the workload domains 129, 131, 133.

If, at block 818, the example workload domain manager 208 determines not to generate the free pool of resources, the example machine readable instructions 800 of FIG. 8 conclude. If, at block 818, the example workload domain manager 208 determines to generate the free pool of resources, then, at block 820, the workload domain manager 208 determines a quantity of servers to be added to the free pool. For example, the resource pool handler 460 may determine a quantity of the free pool servers 310 to be added to the free pool 302 based on one or more of the health statuses, the composition cost, the workload domain historical information, the workload domain characteristics, etc., associated with one or more of the workload domains 129, 131, 133.

At block 822, the example workload domain manager 208 determines whether resources are available based on the policy. For example, the resource discoverer 470 (FIG. 4) may poll available ones of the physical resources 124, 126 of FIGS. 1 and 3 to determine whether servers can be composed in accordance with the policy 304 of FIG. 3.

If, at block 822, the example workload domain manager 208 determines that resources are available based on the policy, then, at block 824, the workload domain manager 208 composes server(s). For example, the resource allocator 430 (FIG. 4) may compose ones of the physical resources 124, 126 to generate ones of the free pool servers 310.

At block 826, the example workload domain manager 208 adds the composed server(s) to the free pool. For example, the resource allocator 430 may add one or more of the free pool servers 310 to the free pool 302. In response to adding the composed server(s) to the free pool, the example machine readable instructions 800 of FIG. 8 conclude.

If, at block 822, the example workload domain manager 208 determines that resources are not available based on the policy, then, at block 828, the workload domain manager 208 determines whether to contract existing workload domain(s). For example, the resource status analyzer 420 may determine that one or more of the workload domains 129, 131, 133 include unused or underutilized resources and can be reallocated to the free pool 302.

If, at block 828, the example workload domain manager 208 determines not to contract existing workload domain(s), the example machine readable instructions 800 conclude. For example, the resource discoverer 470 (FIG. 4) may generate an alert to the data center operator 306, the external client 308, etc., indicating that there are no available resources to compose servers based on the policy 304.

If, at block 828, the example workload domain manager 208 determines to contract existing workload domain(s), then, at block 830, the workload domain manager 208 deallocates server(s) from the workload domain(s) to the free pool. For example, the resource deallocator 440 (FIG. 4) may transfer one or more of the workload domain servers 312 identified to be unused or underutilized from the one or more workload domains 129, 131, 133 to the free pool 302. In response to deallocating the server(s) from the workload domain(s) to the free pool, the example machine readable instructions 800 conclude.

Figure 9:
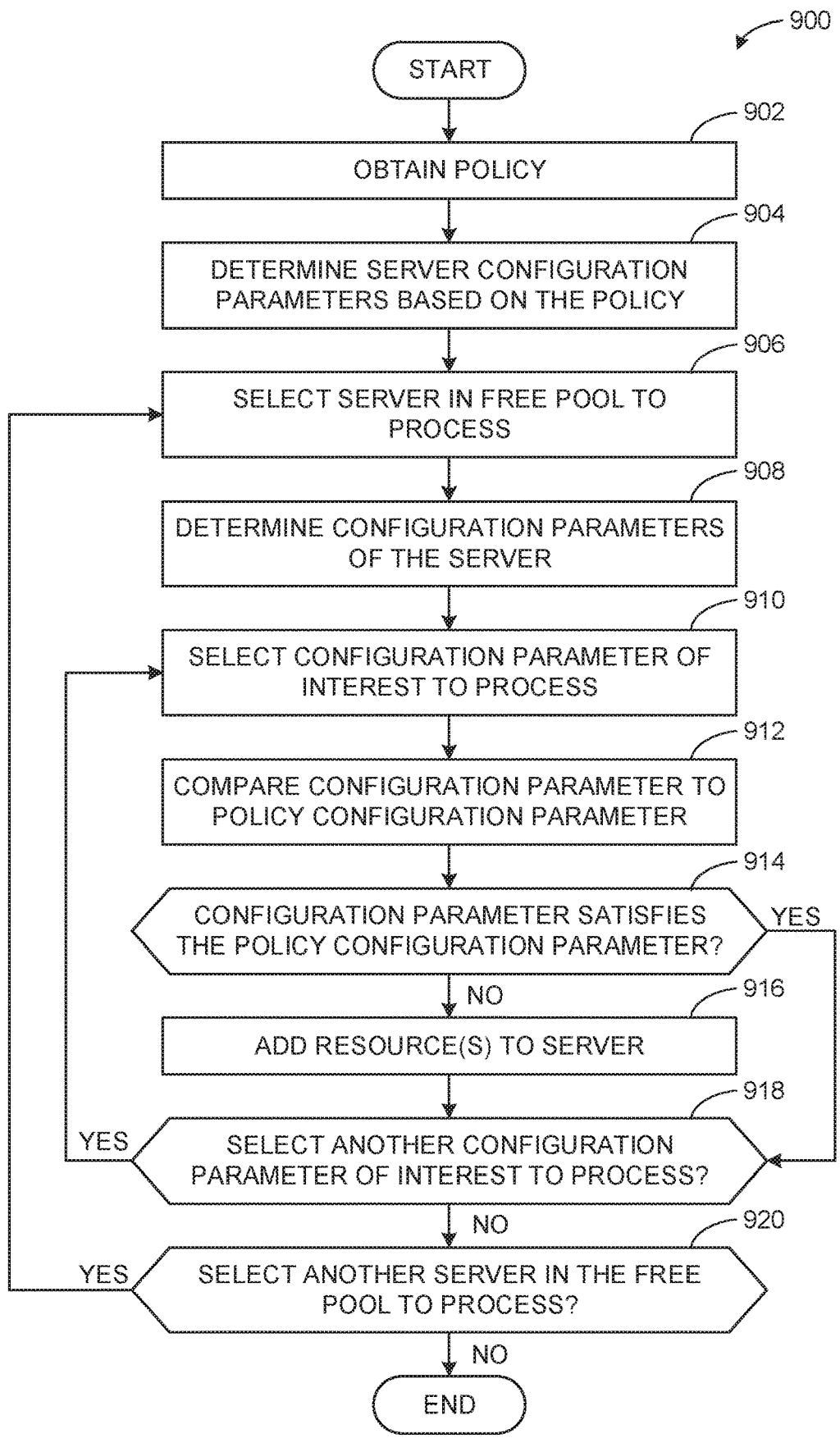
FIG. 9 is a flowchart representative of example machine readable instructions which may be executed to implement the example workload domain manager apparatus of FIG. 4 to adjust a resource included in a free pool of resources.

FIG. 9 is a flowchart representative of example machine readable instructions 900 which may be executed to implement the example workload domain manager 208 of FIGS. 2-4 to adjust a resource included in a free pool of resources. The example machine readable instructions 900 begin at block 902, at which the example workload domain manager 208 obtains a policy. For example, the policy analyzer 410 (FIG. 4) may obtain the policy 304 of FIG. 3 including a requirement, a specification, etc., associated with one or more of the workload domains 129, 131, 133, the free pool 302, etc., of FIGS. 1 and 3.

At block 904, the example workload domain manager 208 determines server configuration parameters based on the policy. For example, the policy analyzer 410 may determine a policy configuration parameter that one or more of the free pool servers 310 included in the free pool 302 must have 10 TB of storage based on the policy 304. In other examples, the policy analyzer 410 may determine a policy configuration parameter that one or more of the free pool servers 310 included in the free pool 302 must have a GPU firmware version of 2.0 based on the policy 304.

At block 906, the example workload domain manager 208 selects a server in a free pool to process. For example, the resource status analyzer 420 (FIG. 4) may select one of the free pool servers 310 included in the free pool 302 to process.

At block 908, the example workload domain manager 208 determines configuration parameters of the server. For example, the resource status analyzer 420 may determine configuration parameters of the selected one of the free pool servers 310. In such examples, the resource status analyzer 420 may determine that the free pool server 310 has a first configuration parameter of 5 TB of storage, a second configuration parameter of a GPU firmware version of 1.8, etc.

At block 910, the example workload domain manager 208, selects a configuration parameter of interest to process. For example, the resource status analyzer 420 may select the first configuration parameter to process. In other examples, the resource status analyzer 420 may select the second configuration parameter to process.

At block 912, the example workload domain manager 208 compares the configuration parameter to the policy configuration parameter. For example, the resource status analyzer 420 may compare the first configuration parameter of 5 TB of storage to the policy configuration parameter of 10 TB of storage. In other examples, the resource status analyzer 420 may compare the second configuration parameter of GPU firmware version 1.8 to the policy configuration parameter of GPU firmware version 2.0

At block 914, the example workload domain manager 208 determines whether the configuration parameter satisfies the policy configuration parameter. For example, the resource status analyzer 420 may compare the first configuration parameter of 5 TB of storage to the policy configuration parameter of 10 TB of storage. In such examples, the resource status analyzer 420 may determine that the first configuration parameter does not satisfy the policy configuration parameter based on the first configuration parameter being less than the policy configuration parameter.

If, at block 914, the example workload domain manager 208 determines that the configuration parameter satisfies the policy configuration parameter, control proceeds to block 918 to determine whether to select another configuration of interest to process. If, at block 914, the example workload domain manager 208 determines that the configuration parameter does not satisfy the policy configuration parameter, then, at block 916, the workload domain manager 208 adds resource(s) to the server. For example, the resource status analyzer 420 may direct the resource allocator 430 (FIG. 4) to add storage (e.g., 5 or more TB of storage) to the free pool server. In other examples, the resource status analyzer 420 may direct the firmware handler 450 to upgrade the firmware of the free pool server 310.

At block 918, the example workload domain manager 208 determines whether to select another configuration parameter of interest to process. For example, the resource status analyzer 420 may determine to process the second configuration parameter.

If, at block 918, the example workload domain manager 208 determines to select another configuration parameter of interest to process, control returns to block 910 to select another configuration parameter of interest to process. If, at block 918, the example workload domain manager 208 determines not to select another configuration parameter of interest to process, then, at block 920, the workload domain manager 208 determines whether to select another server in the free pool to process. For example, the resource status analyzer 420 may determine to select a second one of the free pool servers 310 to process. If, at block 920, the example workload domain manager 208 determines to select another server in the free pool to process, control returns to block 906 to select another server in the free pool to process, otherwise the example machine readable instructions 900 of FIG. 9 conclude.

Figure 10:
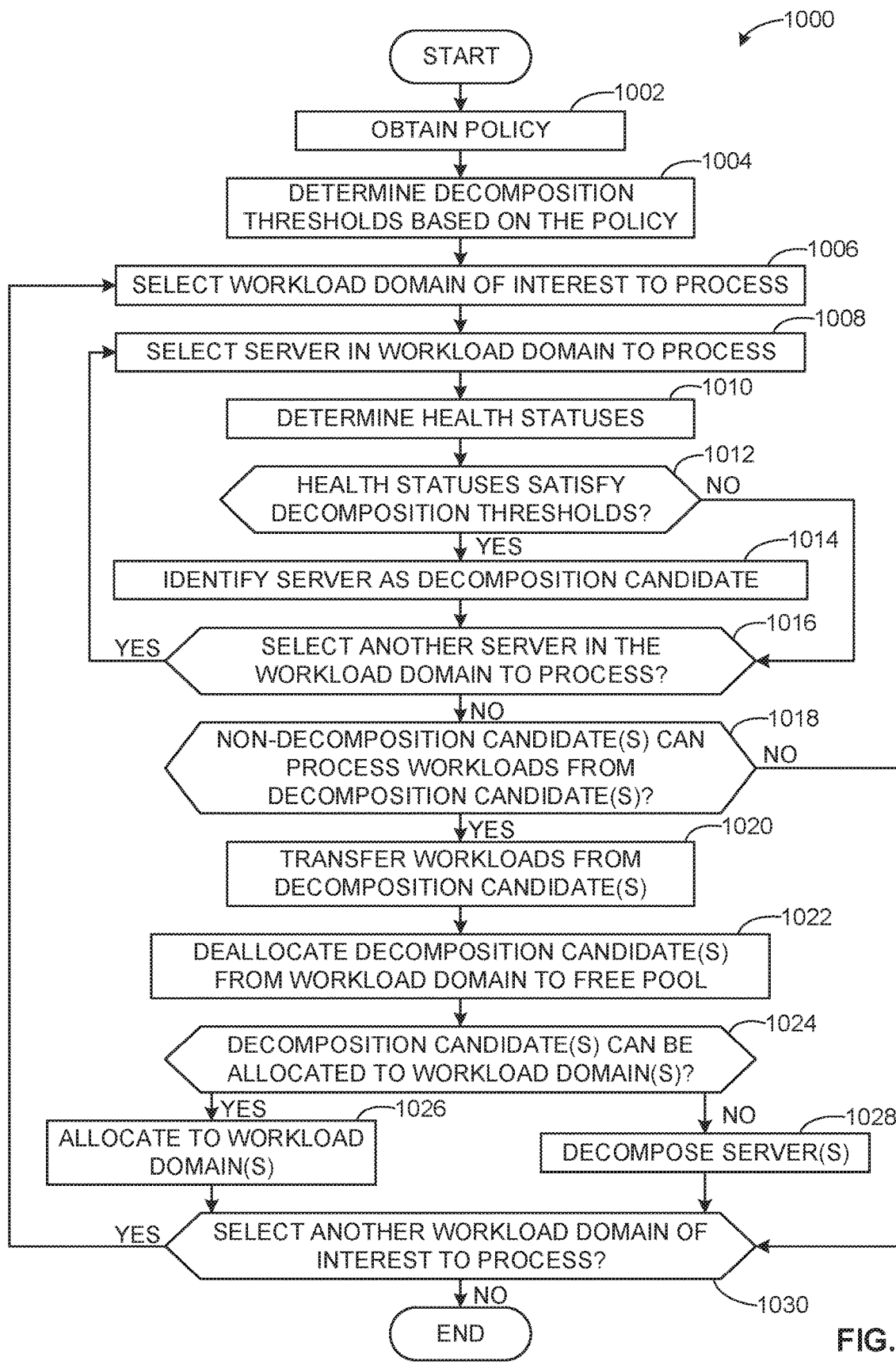
FIG. 10 is a flowchart representative of example machine readable instructions which may be executed to implement the example workload domain manager apparatus of FIG. 4 to adjust a size of a workload domain.

FIG. 10 is a flowchart representative of example machine readable instructions 1000 which may be executed to implement the example workload domain manager 208 of FIGS. 2-4 to adjust a size of a workload domain. The example machine readable instructions 1000 begin at block 1002, at which the example workload domain manager 208 obtains a policy. For example, the policy analyzer 410 (FIG. 4) may obtain the policy 304 of FIG. 3 including a requirement, a specification, etc., associated with one or more of the workload domains 129, 131, 133, the free pool 302, etc., of FIGS. 1 and 3.

At block 1004, the example workload domain manager 208 determines decomposition thresholds based on the policy. For example, the policy analyzer 410 may determine a first decomposition threshold corresponding to a CPU utilization of 60% and a second decomposition threshold corresponding to a storage utilization of 50%. Alternatively, fewer or more decomposition thresholds may be determined.

At block 1006, the example workload domain manager 208 selects a workload domain of interest to process. For example, the resource status analyzer 420 (FIG. 4) may select the first workload domain 129 to process.

At block 1008, the example workload domain manager 208 selects a server in the workload domain to process. For example, the resource status analyzer 420 may select a first one of the workload domain servers 312 included in the first workload domain 129 to process.

At block 1010, the example workload domain manager 208 determines health statuses. For example, the resource status analyzer 420 may determine a first health status corresponding to a CPU utilization of 20% and a second health status corresponding to a storage utilization of 10%. Alternatively, fewer or more health statuses may be determined.

At block 1012, the example workload domain manager 208 determines whether the health statuses satisfy the decomposition thresholds. For example, the resource status analyzer 420 may determine that the first health status satisfies the first decomposition threshold based on the first health status of 20% being less than the first decomposition threshold of 60%. The example resource status analyzer 420 may determine that the second health status satisfies the second decomposition threshold based on the second health status of 10% being less than the second decomposition threshold of 50%.

If, at block 1012, the example workload domain manager 208 determines that the health statuses do not satisfy the decomposition thresholds, control proceeds to block 1016 to determine whether to select another sever in the workload domain to process. If, at block 1012, the example workload domain manager 208 determines that the health statuses do satisfy the decomposition thresholds, then, at block 1014, the workload domain manager 208 identifies the server as a decomposition candidate. For example, the resource status analyzer 420 may identify the first one of the workload domain servers 312 as a candidate to be transferred to the free pool 302 to improve utilization of virtual resources.

At block 1016, the example workload domain manager 208 determines whether to select another server in the workload domain to process. For example, the resource status analyzer 420 may select a second one of the workload domain servers 312 allocated to the first workload domain 129 to process.

If, at block 1016, the example workload domain manager 208 determines to select another server in the workload domain to process, control returns to block 1008 to select another server in the workload domain to process. If, at block 1016, the example workload domain manager 208 determines not to select another server in the workload domain to process, then, at block 1018, the workload domain manager 208 determines whether non-decomposition candidate(s) can process workloads from the decomposition candidate(s). For example, the resource status analyzer 420 may determine that a third one and a fourth one of the workload domain servers 312 allocated to the first workload domain 129 can process the workloads being processed by the first one of the workload domain servers 312 without exceeding one or more health status thresholds. For example, the third one and the fourth one of the workload domain servers 312 may have unused computing resources, storage resources, etc.

If, at block 1018, the example workload domain manager 208 determines that the non-decomposition candidate(s) cannot process the workloads from the decomposition candidate(s), control proceeds to block 1028 to determine whether to select another workload domain of interest to process. If, at block 1018, the example workload domain manager 208 determines that the non-decomposition candidate(s) can process the workloads from the decomposition candidate(s), then, at block 1020, the workload domain manager 208 transfers the workloads from the decomposition candidate(s). For example, the resource status analyzer 420 can transfer the workloads of the first one of the workload domain servers 312 to the third one and/or the fourth one of the workload domain servers 312.

At block 1022, the example workload domain manager 208 deallocates the decomposition candidate(s) from the workload domain to the free pool. For example, the resource deallocator 440 may remove the first one of the workload domain servers 312 from the first workload domain 129 to the free pool 302.

At block 1024, the example workload domain manager 208 determines whether the decomposition candidate(s) can be allocated to workload domain(s). For example, the resource status analyzer 420 may determine health statuses of the second workload domain 131, the third workload domain 133, etc., and determine to allocate the decomposition candidate to the second workload domain 131, the third workload domain 133, etc., based on the health statuses.

If, at block 1024, the example workload domain manager 208 determines that the decomposition candidate(s) can be allocated to workload domain(s), then, at block 1026, the resource allocator 430 allocates the decomposition candidate(s) to the workload domain(s). If, at block 1024, the example workload domain manager 208 determines that the decomposition candidate(s) cannot be allocated to workload domain(s), then, at block 1028, the workload domain manager 208 decomposes the server(s). For example, the resource pool handler 460 may decompose the decomposition candidate by disaggregating the resources and returning the resources back to the physical racks 102, 104.

In response to allocating the decomposition candidate(s) to the workload domain(s) at block 1026 or decomposing the decomposition candidate(s) at block 1028, the example workload domain manager 208 determines whether to select another workload domain of interest to process at block 1028. For example, the resource status analyzer 420 may determine to select the second workload domain 131 to process. If, at block 1028, the example workload domain manager 208 determines to select another workload domain of interest to process, control returns to block 1006 to select another workload domain of interest to process, otherwise the example machine readable instructions 1000 of FIG. 10 conclude.

Figure 11:
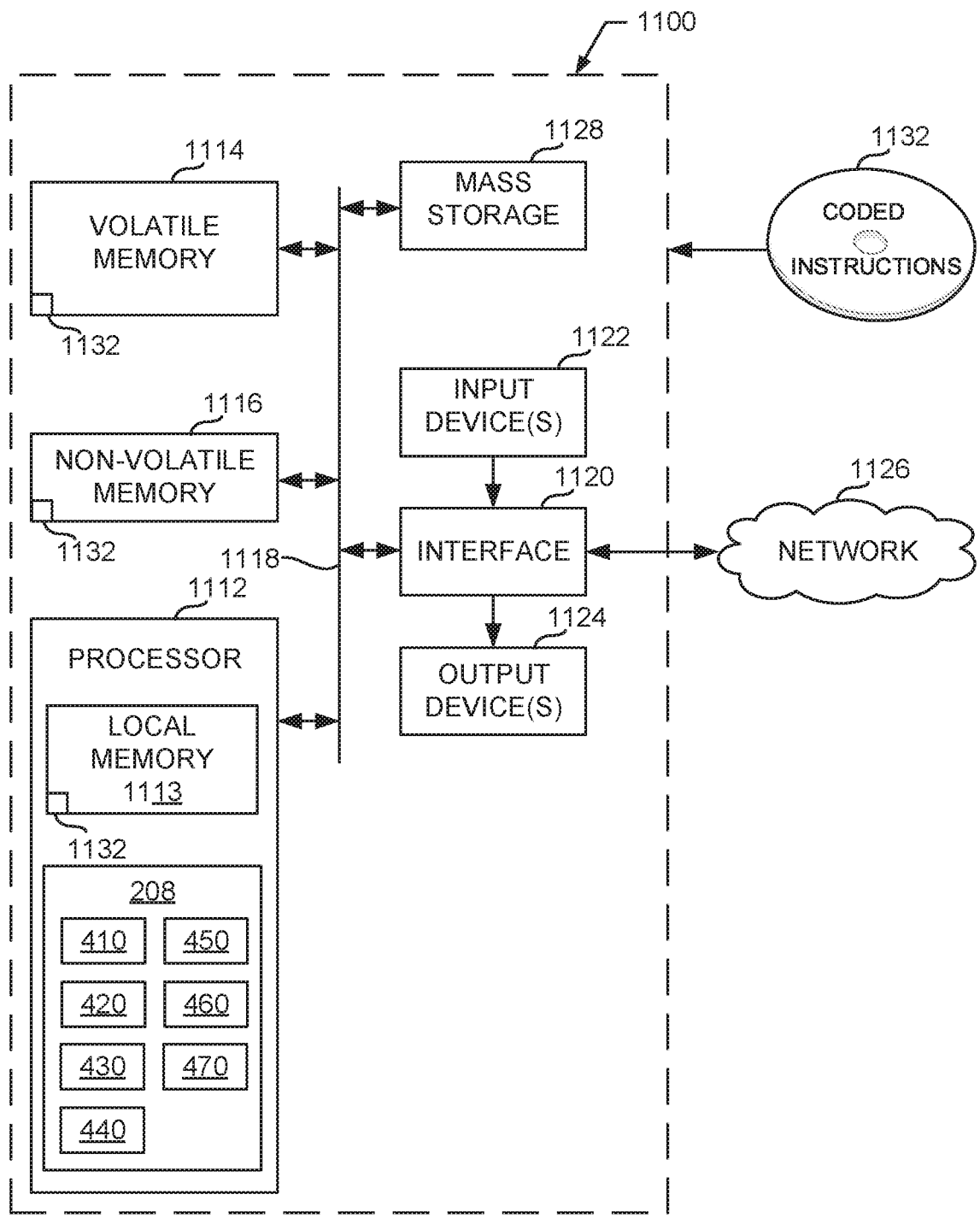
FIG. 11 is a block diagram of an example processing platform structured to execute the instructions of FIGS. 5-10 to implement the example workload domain manager apparatus of FIG. 4.

FIG. 11 is a block diagram of an example processor platform 1100 structured to execute the instructions of FIGS. 5-10 to implement the workload domain manager 208 of FIGS. 2-4. The processor platform 1100 can be, for example, a server, a personal computer, a workstation, a self-learning machine (e.g., a neural network), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1112 implements the example policy analyzer 410, the example resource status analyzer 420, the example resource allocator 430, the example resource deallocator 440, the example firmware handler 450, the example resource pool handler 460, and the example resource discoverer 470 of FIG. 4.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

Example machine executable instructions 1132 represented by the flowcharts of FIGS. 5-10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus, and articles of manufacture have been disclosed that improve an efficiency of executing an application using a virtualized server. In the above-disclosed examples, a server can be composed using one or more pooled hardware resources to right-size a virtualized server to meet user requirements. In the above-disclosed examples, a free pool of resources is used to improve an efficiency of processing workloads by dynamically allocating resources in the free pool to one or more workload domains based on a health status of the one or more workload domains. For example, a workload domain may execute a workload with increased speed by allocating resources in the free pool to the workload domain based on one or more health statuses of the workload domain. In the above-disclosed examples, the free pool of resources can be used to improve an efficiency and/or speed of upgrading firmware or software of virtualized servers corresponding to physical hardware resources by transferring workloads from non-upgraded servers to upgraded servers and upgrading the non-upgraded servers while the non-upgraded servers are in the composed state. By transferring the workloads to upgraded servers, an unavailability of a workload domain may be reduced and/or otherwise minimized by reducing a delay incurred by backing up a workload on a non-upgraded server, upgrading the non-upgrading server, and restoring the workload on the newly upgraded server.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus, comprising:
    a resource pool handler to generate a pool of virtualized servers based on a policy, ones of the virtualized servers to be allocated to a first workload domain to execute an application;
    a resource status analyzer to:
        determine whether a number of the ones of the virtualized servers is less than a first threshold, the first threshold based on a quantity of virtualized servers;
        determine a health status associated with a first virtualized server allocated to a second workload domain after a determination that the number of the ones of the virtualized servers is less than the first threshold;
        determine whether the health status satisfies a second threshold based on the policy; and
        transfer a workload of the first virtualized server to a second virtualized server of the second workload domain after the health status satisfies the second threshold, the health status of the first virtualized server satisfying the second threshold to indicate an underutilization of the first virtualized server; and
    a resource allocator to, after a transfer of the workload from the first virtualized server to the second virtualized server, allocate the first virtualized server to the first workload domain to execute the application on the first virtualized server, at least one of the resource pool handler, the resource status analyzer, or the resource allocator is implemented with hardware.

2. The apparatus of claim 1, wherein the health status is at least one of an availability health status, a capacity health status, or a performance health status.

3. The apparatus of claim 1, wherein the pool includes a shadow pool, the shadow pool including at least a third virtualized server, the third virtualized server available to be allocated only to the first workload domain.

4. The apparatus of claim 1, wherein the resource pool handler is to:
    calculate a cost of composition to compose one of the virtualized servers;
    obtain historical information associated with the first workload domain;
    obtain a workload domain characteristic associated with the first workload domain;
    determine a quantity of the virtualized servers to be composed based on at least one of the cost of composition, the historical information, or the workload domain characteristic; and
    generate the pool based on a composition of the quantity of the virtualized servers.

5. The apparatus of claim 4, further including a resource discoverer to determine whether resources are available to compose the quantity of the virtualized servers, the resource status analyzer to determine whether to contract the second workload domain to release the first virtualized server after the resource discoverer determines that the resources are not available, and the resource allocator to compose one of the quantity of the virtualized servers using the first virtualized server after the resource status analyzer determines to contract the second workload domain.

6. The apparatus of claim 1, wherein the health status is a first health status, the resource status analyzer to determine whether a second health status indicates a non-responsive status of a third virtualized server included in the first workload domain, and further including a resource deallocator to deallocate the third virtualized server to the pool after the resource status analyzer determines that the second health status indicates the non-responsive status, the resource allocator to allocate one of the virtualized servers to the first workload domain to execute the application.

7. The apparatus of claim 1, wherein the determination is a first determination, the resource allocator is to compose ones of the virtualized servers after a second determination that a quantity of the virtualized servers does not satisfy a minimum quantity threshold, and further including a resource deallocator to decompose ones of the virtualized servers after a third determination that the quantity of the virtualized servers satisfies a maximum quantity threshold.

8. The apparatus of claim 1, wherein the resource status analyzer is to select the first virtualized server after determining that the first virtualized server has been unused for a number of days that satisfies a third threshold, the third threshold indicative of a quantity of days based on the policy.

9. A non-transitory computer readable storage medium comprising instructions which, when executed, cause a machine to at least:
generate a pool of virtualized servers based on a policy, ones of the virtualized servers to be allocated to a first workload domain to execute an application;
determine whether a number of the ones of the virtualized servers is less than a first threshold, the first threshold based on a quantity of virtualized servers;
determine a health status associated with a first virtualized server allocated to a second workload domain after a determination that the number of the ones of the virtualized servers is less than the first threshold;
determine whether the health status satisfies a second threshold based on the policy;
transfer a workload of the first virtualized server to a second virtualized server of the second workload domain after the health status satisfies the second threshold, the health status of the first virtualized server satisfying the second threshold to indicate an underutilization of the first virtualized server; and
after a transfer of the workload from the first virtualized server to the second virtualized server, allocate the first virtualized server to the first workload domain to execute the application on the first virtualized server.

10. The non-transitory computer readable storage medium of claim 9, wherein the health status is at least one of an availability health status, a capacity health status, or a performance health status.

11. The non-transitory computer readable storage medium of claim 9, wherein the pool includes a shadow pool, the shadow pool including at least a third virtualized server, the third virtualized server available to be allocated only to the first workload domain.

12. The non-transitory computer readable storage medium of claim 9, wherein the instructions, when executed, cause the machine to at least:
calculate a cost of composition to compose one of the virtualized servers;
obtain historical information associated with the first workload domain;
obtain a workload domain characteristic associated with the first workload domain;
determine a quantity of the virtualized servers to be composed based on at least one of the cost of composition, the historical information, or the workload domain characteristic; and
generate the pool by composing the quantity of the virtualized servers.

13. The non-transitory computer readable storage medium of claim 12, wherein the determination is a first determination, and the instructions, when executed, cause the machine to at least:
determine whether resources are available to compose the quantity of the virtualized servers;
determine whether to contract the second workload domain to release the first virtualized server after a second determination that the resources are not available; and
compose one of the quantity of the virtualized servers using the first virtualized server after a third determination to contract the second workload domain.

14. The non-transitory computer readable storage medium of claim 9, wherein the determination is a first determination, the health status is a first health status, and the instructions, when executed, cause the machine to at least:
determine whether a second health status indicates a non-responsive status of a third virtualized server included in the first workload domain;
deallocate the third virtualized server to the pool after a second determination that the second health status indicates the non-responsive status; and
allocate one of the virtualized servers to the first workload domain to execute the application.

15. The non-transitory computer readable storage medium of claim 9, wherein the determination is a first determination, and the instructions, when executed, cause the machine to at least:
compose ones of the virtualized servers after a second determination that a quantity of the virtualized servers does not satisfy a minimum quantity threshold; and
decompose ones of the virtualized servers after a third determination that the quantity of the virtualized servers satisfies a maximum quantity threshold.

16. A method, comprising:
generating a pool of virtualized servers based on a policy, ones of the virtualized servers to be allocated to a first workload domain to execute an application;
determining whether a number of the ones of the virtualized servers is less than a first threshold, the first threshold based on a quantity of virtualized servers;
determining a health status associated with a first virtualized server allocated to a second workload domain after determining that the number of the ones of the virtualized servers is less than the first threshold;
determining whether the health status satisfies a second threshold based on the policy;
transferring a workload of the first virtualized server to a second virtualized server of the second workload domain after determining that the health status satisfies the second threshold, the health status of the first virtualized server satisfying the second threshold to indicate an underutilization of the first virtualized server; and
after transferring the workload from the first virtualized sever to the second virtualized server, allocating the first virtualized server to the first workload domain to execute the application on the first virtualized server.

17. The method of claim 16, wherein the health status is at least one of an availability health status, a capacity health status, or a performance health status.

18. The method of claim 16, wherein the pool includes a shadow pool, the shadow pool including at least a third virtualized server, the third virtualized server available to be allocated only to the first workload domain.

19. The method of claim 16, wherein the generating of the pool includes:
calculating a cost of composition to compose one of the virtualized servers;
obtaining historical information associated with the first workload domain;
obtaining a workload domain characteristic associated with the first workload domain;
determining a quantity of the virtualized servers to be composed based on at least one of the cost of composition, the historical information, or the workload domain characteristic; and
generating the pool by composing the quantity of the virtualized servers.

20. The method of claim 19, further including:
determining whether resources are available to compose the quantity of the virtualized servers;
after determining that the resources are not available, determining whether to contract the second workload domain to release the first virtualized server; and
after determining to contract the second workload domain, composing one of the quantity of the virtualized servers using the first virtualized server.

21. The method of claim 16, wherein the health status is a first health status, and further including:
determining whether a second health status indicates a non-responsive status of a third virtualized server included in the first workload domain;
after determining that the second health status indicates the non-responsive status, deallocating the third virtualized server to the pool; and
allocating one of the virtualized servers to the first workload domain to execute the application.

22. The method of claim 16, further including:
after determining that a quantity of the virtualized servers does not satisfy a minimum quantity threshold, composing ones of the virtualized servers; and
after determining that the quantity of the virtualized servers satisfies a maximum quantity threshold, decomposing ones of the virtualized servers.

23. An apparatus comprising:
memory;
machine readable instructions in the apparatus; and
processor circuitry to execute the machine readable instructions to at least:
generate a pool of virtualized servers based on a policy, ones of the virtualized servers to be allocated to a first workload domain, the first workload domain to cause an execution of an application;
determine whether a number of the ones of the virtualized servers is less than a first threshold, the first threshold based on a quantity of virtualized servers;
determine a health status associated with a first virtualized server allocated to a second workload domain, the health status to be determined after a first determination that the number of the ones of the virtualized servers is less than the first threshold;
determine whether the health status satisfies a second threshold based on the policy;
move a workload of the first virtualized server to a second virtualized server after a second determination that the health status satisfies the second threshold, the health status of the first virtualized server satisfying the second threshold to indicate that the first virtualized server is less utilized than the second virtualized server, the second virtualized server part of the second workload domain; and
after a movement of the workload from the first virtualized server to the second virtualized server, associate the first virtualized server with the first workload domain to execute the application on the first virtualized server.

24. The apparatus of claim 23, wherein the health status is at least one of an availability health status, a capacity health status, or a performance health status.

25. The apparatus of claim 23, wherein the pool includes a shadow pool, the shadow pool, the shadow pool including at least a third virtualized server, the third virtualized server available to be allocated exclusively to the first workload domain.

26. The apparatus of claim 23, wherein the processor circuitry is to execute the machine readable instructions to:
determine a cost of composition to compose one of the virtualized servers;
determine historical information associated with the first workload domain;
determine a workload domain characteristic associated with the first workload domain;
determine a quantity of the virtualized servers to be composed based on at least one of the cost of composition, the historical information, or the workload domain characteristic; and
generate the pool by composing the quantity of the virtualized servers.

27. The apparatus of claim 26, wherein the processor circuitry is to execute the machine readable instructions to:
determine whether resources are available to compose the quantity of the virtualized servers;
determine whether to contract the second workload domain to release the first virtualized server from the second workload domain after a third determination that the resources are not available; and
compose one of the quantity of the virtualized servers using one or more resources associated with the first virtualized server after a fourth determination to contract the second workload domain.

28. The apparatus of claim 23, wherein the health status is a first health status, and the processor circuitry is to execute the machine readable instructions to:
determine whether a second health status is indicative of a non-responsive status of a third virtualized server of the first workload domain;
move the third virtualized server to the pool after a third determination that the second health status is indicative of the non-responsive status; and
allocate one of the virtualized servers to the first workload domain.

29. The apparatus of claim 23, wherein the processor circuitry is to execute the machine readable instructions to:
instantiate ones of the virtualized servers after a third determination that a quantity of the virtualized servers does not satisfy a minimum quantity threshold; and
decompose ones of the virtualized servers after a fourth determination that the quantity of the virtualized servers satisfies a maximum quantity threshold.

30. The apparatus of claim 23, wherein the processor circuitry is to execute the machine readable instructions to select the first virtualized server after a third determination that the first virtualized server has been unused for a number of days, the number of days satisfying a third threshold indicative of a quantity of days based on the policy.

* * * * *